(12) United States Patent
Chang et al.

(10) Patent No.: US 9,989,731 B2
(45) Date of Patent: Jun. 5, 2018

(54) OPTICAL IMAGING LENS

(71) Applicant: Genius Electronic Optical Co., Ltd., Taichung (TW)

(72) Inventors: Kuo-Wen Chang, Taichung (TW); Wei-Chih Chao, Taichung (TW); Feng Li, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 0 days. days.

(21) Appl. No.: 15/213,404

(22) Filed: Jul. 19, 2016

(65) Prior Publication Data

US 2017/0351061 A1    Dec. 7, 2017

(30) Foreign Application Priority Data

Jun. 2, 2016  (CN) .......................... 2016 1 0388133

(51) Int. Cl.
| *G02B 9/34* | (2006.01) |
| *G02B 9/32* | (2006.01) |
| *G02B 13/00* | (2006.01) |
| *G02B 27/00* | (2006.01) |

(52) U.S. Cl.
CPC ................ G02B 9/34 (2013.01); G02B 9/32 (2013.01); G02B 13/004 (2013.01); G02B 13/0045 (2013.01); G02B 27/0025 (2013.01)

(58) Field of Classification Search
CPC ... G02B 9/34; G02B 9/36; G02B 9/38; G02B 9/40; G02B 9/42; G02B 9/44; G02B 9/46; G02B 9/48; G02B 9/50; G02B 9/52; G02B 9/54; G02B 9/56; G02B 9/60; G02B 9/62; G02B 9/64; G02B 13/004; G02B 13/0045
USPC ................ 359/708–715, 745–747, 754–760, 359/763–769, 772–780
See application file for complete search history.

(56) References Cited

U.S. PATENT DOCUMENTS

| 2010/0208359 A1* | 8/2010 | Chen ...................... G02B 13/04 359/687 |
| 2014/0293457 A1* | 10/2014 | Sudoh ...................... G02B 9/62 359/757 |
| 2016/0077309 A1* | 3/2016 | Ohashi ................. G02B 15/163 359/740 |
| 2016/0077310 A1* | 3/2016 | Sudoh ...................... G02B 9/60 359/764 |

* cited by examiner

*Primary Examiner* — Darryl J Collins
(74) *Attorney, Agent, or Firm* — JCIPRNET

(57) ABSTRACT

An optical imaging lens includes first, second, third, and fourth lens elements arranged in order from an object side to an image side along an optical axis. Each lens element has an object-side surface and an image-side surface. The first lens element has positive refracting power. The object-side surface of the first lens element has a convex portion in a vicinity of the optical axis. The second lens element has refracting power. At least one of the object-side surface and the image-side surface of the third lens element is an aspheric surface. The object-side surface and the image-side surface of the fourth lens element are both aspheric surfaces.

20 Claims, 34 Drawing Sheets

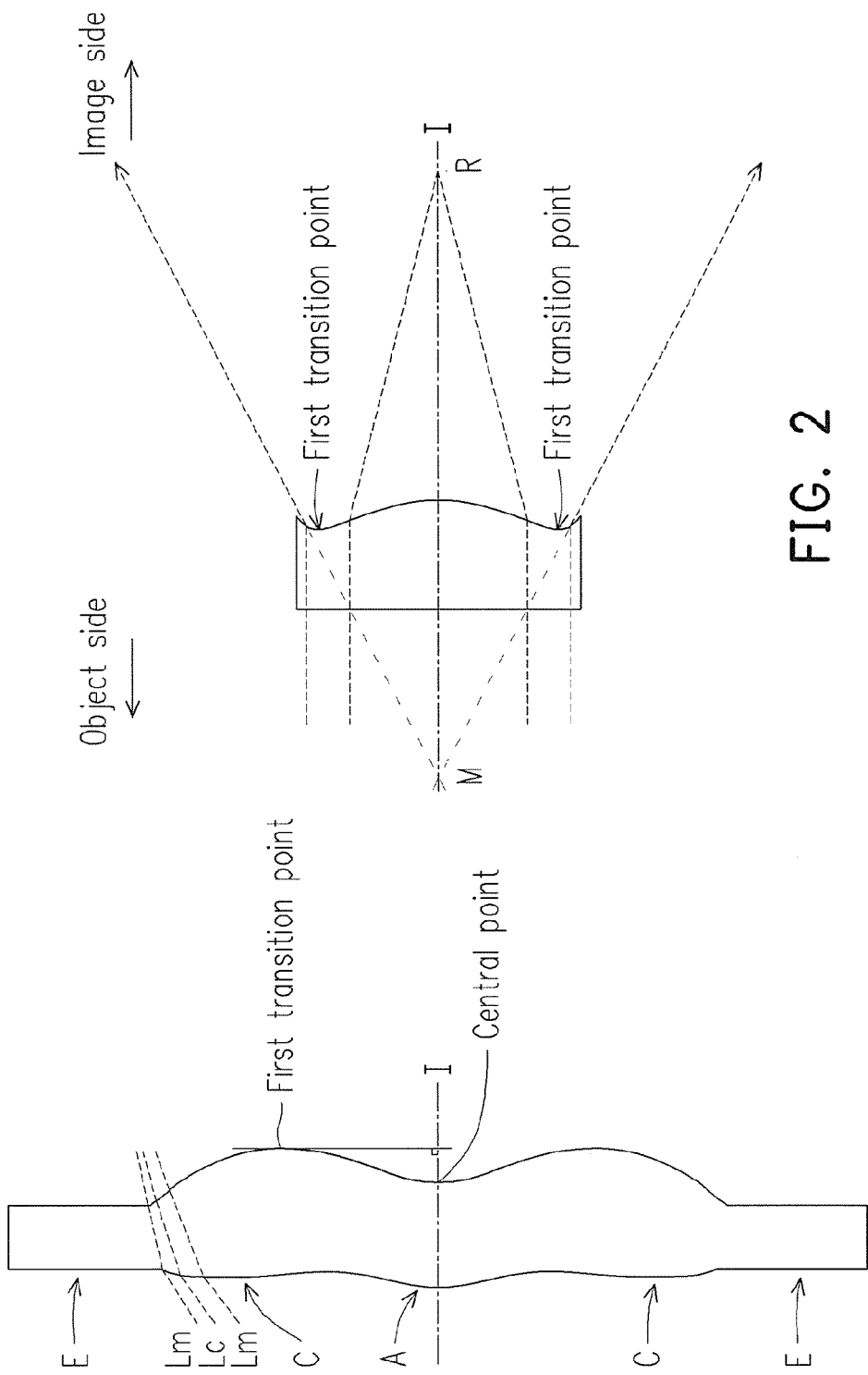

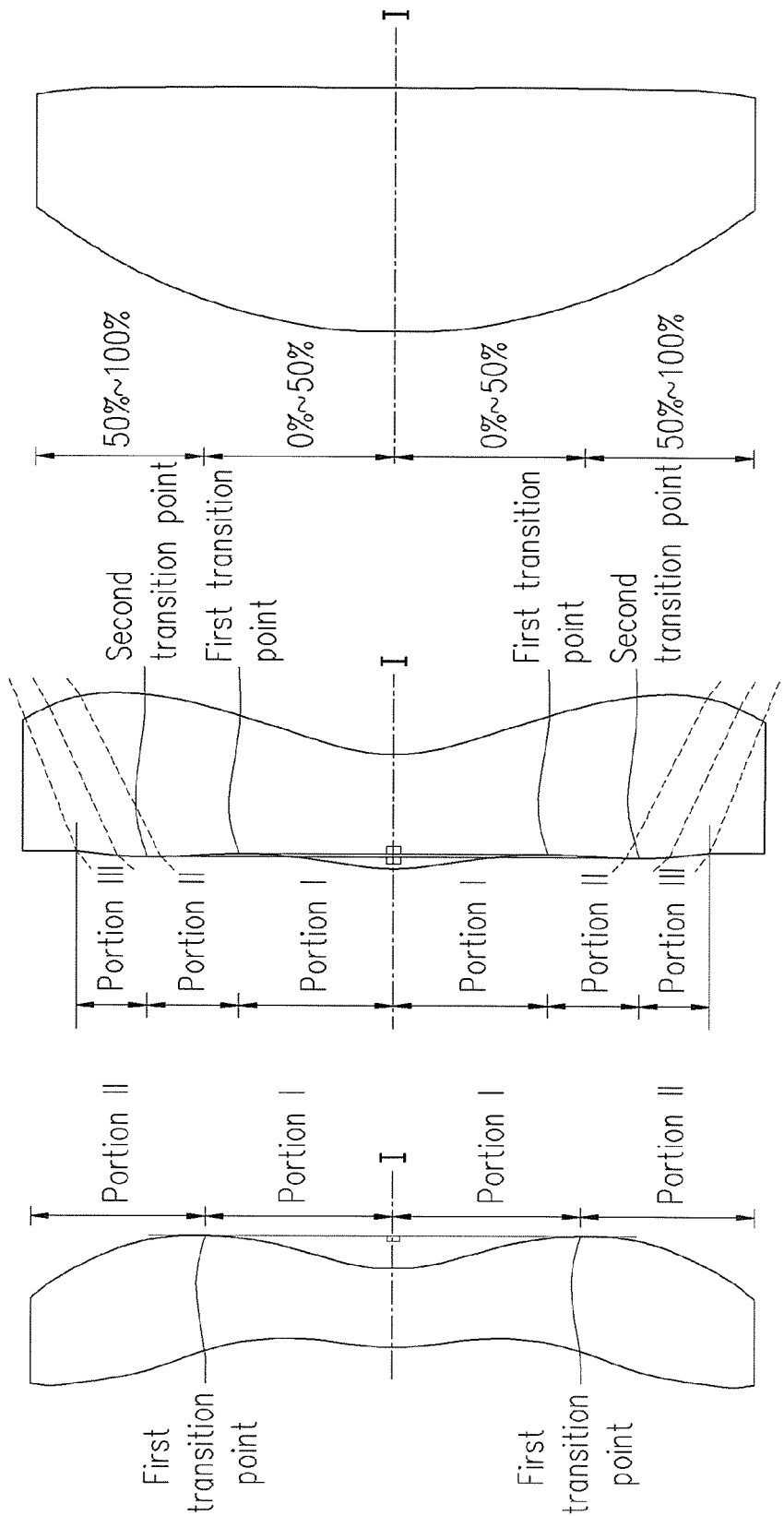

| First embodiment | | | | | | |
|---|---|---|---|---|---|---|
| Effective focal length=7.069 mm , HFOV =18.531°, f-number=2.490, System length=6.602 mm, Image height=2.4 mm | | | | | | |
| Lens element | Surface | Radius of curvature(mm) | Thickness(mm) | Index of refraction | Dispersion coefficient | Focal length(mm) |
| Object | | Infinity | 1.000E+10 | | | |
| Aperture 2 | | Infinity | -0.672 | | | |
| First lens element 3 | Object-side surface 31 | 1.798 | 1.264 | 1.545 | 55.987 | 2.896 |
| | Image-side surface 32 | -9.895 | 0.168 | | | |
| Second lens element 4 | Object-side surface 41 | -10.342 | 0.230 | 1.642 | 22.409 | -3.886 |
| | Image-side surface 42 | 3.353 | 1.978 | | | |
| Third lens element 5 | Object-side surface 51 | -4.412 | 0.696 | 1.642 | 22.409 | 5.414 |
| | Image-side surface 52 | -2.074 | 0.083 | | | |
| Fourth lens element 6 | Object-side surface 61 | -1.722 | 0.748 | 1.535 | 55.690 | -3.547 |
| | Image-side surface 62 | -20.763 | 0.400 | | | |
| Filter 9 | Object-side surface 91 | Infinity | 0.210 | 1.517 | 64.167 | |
| | Image-side surface 92 | Infinity | 0.604 | | | |
| | Image plane 100 | Infinity | | | | |

FIG. 8

| Surface | K | $a_4$ | $a_6$ | $a_8$ | $a_{10}$ |
|---|---|---|---|---|---|
| 31 | 0.000000E+00 | -4.895332E-03 | 2.282431E-03 | -1.057937E-03 | -1.548842E-04 |
| 32 | 0.000000E+00 | 5.237613E-02 | -3.994379E-02 | 1.657700E-02 | -2.455061E-03 |
| 41 | 0.000000E+00 | 1.308354E-01 | -1.417197E-01 | 8.408596E-02 | -1.828603E-02 |
| 42 | 0.000000E+00 | 1.074487E-01 | -5.405457E-02 | 1.768425E-02 | 2.116810E-02 |
| 51 | 0.000000E+00 | -2.216324E-02 | -4.314651E-02 | 7.376565E-03 | 8.607897E-05 |
| 52 | 0.000000E+00 | 7.627045E-02 | -2.831023E-02 | -2.668143E-02 | 9.597380E-03 |
| 61 | 0.000000E+00 | 7.496410E-02 | 1.534905E-02 | -4.139987E-02 | 9.519276E-03 |
| 62 | 0.000000E+00 | -6.374864E-02 | 2.730653E-02 | -7.655380E-03 | 8.078285E-04 |
| Surface | $a_{12}$ | | | | |
| 31 | 0.000000E+00 | | | | |
| 32 | 0.000000E+00 | | | | |
| 41 | 0.000000E+00 | | | | |
| 42 | 0.000000E+00 | | | | |
| 51 | 0.000000E+00 | | | | |
| 52 | 0.000000E+00 | | | | |
| 61 | 9.051739E-04 | | | | |
| 62 | -1.460253E-05 | | | | |

FIG. 9A

| Variable gap | G12 | G23 | G34 | G4F |
|---|---|---|---|---|
| fG | 2.896 | 5.676 | 4.786 | 7.069 |
| EFL/(fG×F/#) | 0.980 | 0.500 | 0.593 | 0.402 |
| Shift range for focusing | 0.0644 | 0.336 | 0.2212 | 0.5247 |

FIG. 9B

| Second embodiment | | | | | | |
|---|---|---|---|---|---|---|
| Effective focal length=8.696 mm , HFOV =18.617°, f-number=2.307, System length= 6.382 mm, Image height=2.944 mm | | | | | | |
| Lens element | Surface | Radius of curvature(mm) | Thickness(mm) | Index of refraction | Dispersion coefficient | Focal length(mm) |
| Object | | Infinity | 1.000E+10 | | | |
| Aperture2 | | Infinity | -0.909 | | | |
| First lens element 3 | Object-side surface 31 | 2.344 | 1.460 | 1.545 | 55.987 | 3.794 |
| | Image-side surface 32 | -13.965 | 0.050 | | | |
| First additional lens element 7 | Object-side surface 71 | -22.986 | 0.241 | 1.642 | 22.409 | -6.677 |
| | Image-side surface 72 | 5.345 | 1.476 | | | |
| Second lens element 4 | Object-side surface 41 | -5.560 | 0.298 | 1.545 | 55.987 | -19.216 |
| | Image-side surface 42 | -12.045 | 1.768 | | | |
| Third lens element 5 | Object-side surface 51 | -143.315 | 0.525 | 1.642 | 22.409 | -101.299 |
| | Image-side surface 52 | 121.056 | 0.130 | | | |
| Fourth lens element 6 | Object-side surface 61 | -33.474 | 0.401 | 1.535 | 55.690 | -22.172 |
| | Image-side surface 62 | 18.535 | 0.400 | | | |
| Filter 9 | Object-side surface 91 | Infinity | 0.210 | 1.517 | 64.167 | |
| | Image-side surface 92 | Infinity | 0.983 | | | |
| | Image plane 100 | Infinity | | | | |

FIG. 12

| Surface | K | $a_4$ | $a_6$ | $a_8$ | $a_{10}$ |
|---|---|---|---|---|---|
| 31 | 0.000000E+00 | -1.935571E-03 | 5.070571E-04 | -1.772831E-04 | 2.059176E-05 |
| 32 | 0.000000E+00 | 5.447674E-03 | 3.026257E-04 | -1.174123E-04 | -4.622263E-06 |
| 71 | 0.000000E+00 | 1.824485E-03 | 8.467231E-04 | -2.047950E-04 | -2.535476E-06 |
| 72 | 0.000000E+00 | 1.008405E-04 | 1.670999E-03 | -4.291957E-04 | 7.260285E-05 |
| 41 | 1.200846E+01 | -4.466945E-03 | -4.146778E-03 | 4.112183E-03 | -1.500442E-03 |
| 42 | -2.880524E+01 | -3.733985E-03 | 6.299599E-03 | -4.935090E-04 | -7.633175E-05 |
| 51 | 5.270323E+00 | -3.079109E-02 | 1.504937E-04 | 4.932514E-04 | -2.478724E-05 |
| 52 | 7.045769E+00 | -5.064037E-02 | 2.747550E-03 | 2.065579E-04 | 1.897284E-05 |
| 61 | 1.446239E+02 | -3.571230E-02 | 1.237668E-03 | 3.250575E-04 | 6.431884E-06 |
| 62 | 4.368109E+01 | -1.363457E-02 | 2.867727E-05 | -2.560906E-04 | 3.885576E-05 |

| Surface | $a_{12}$ |
|---|---|
| 31 | 0.000000E+00 |
| 32 | 0.000000E+00 |
| 71 | 0.000000E+00 |
| 72 | 0.000000E+00 |
| 41 | 0.000000E+00 |
| 42 | 0.000000E+00 |
| 51 | 0.000000E+00 |
| 52 | 0.000000E+00 |
| 61 | -8.138694E-07 |
| 62 | -2.116743E-06 |

FIG. 13A

| Variable gap | G1a | Ga2 | G23 | G34 | G4F |
|---|---|---|---|---|---|
| fG | 3.794 | 6.519 | 7.95 | 8.104 | 8.696 |
| EFL/(fG×F/#) | 0.994 | 0.578 | 0.474 | 0.465 | 0.433 |
| Shift range for focusing | 0.0991 | 0.3008 | 0.6505 | 0.5056 | 0.805 |

FIG. 13B

| Third embodiment ||||||
|---|---|---|---|---|---|
| Effective focal length= 9.000 mm , HFOV = 17.846°, f-number= 1.916, System length= 7.958 mm, Image height= 2.4 mm ||||||
| Lens element | Surface | Radius of curvature(mm) | Thickness(mm) | Index of refraction | Dispersion coefficient | Focal length(mm) |
| Object | | Infinity | 1.000E+10 | | | |
| Aperture 2 | | Infinity | -1.163 | | | |
| First lens element 3 | Object-side surface 31 | 3.006 | 0.771 | 1.545 | 55.987 | 6.707 |
| | Image-side surface 32 | 15.224 | 0.337 | | | |
| First additional lens element 7 | Object-side surface 71 | 5.346 | 0.190 | 1.642 | 22.409 | -7.239 |
| | Image-side surface 72 | 2.462 | 0.086 | | | |
| Second additional lens element 8 | Object-side surface 81 | 3.231 | 1.437 | 1.545 | 55.987 | 4.935 |
| | Image-side surface 82 | -13.720 | 1.011 | | | |
| Second lens element 4 | Object-side surface 41 | -1.956 | 0.237 | 1.545 | 55.987 | -9.390 |
| | Image-side surface 42 | -3.297 | 1.533 | | | |
| Third lens element 5 | Object-side surface 51 | -12.221 | 0.293 | 1.545 | 55.987 | -4.530 |
| | Image-side surface 52 | 3.130 | 0.342 | | | |
| Fourth lens element 6 | Object-side surface 61 | 9.138 | 0.819 | 1.642 | 22.409 | 21.796 |
| | Image-side surface 62 | 25.018 | 0.400 | | | |
| Filter 9 | Object-side surface 91 | Infinity | 0.210 | 1.517 | 64.167 | |
| | Image-side surface 92 | Infinity | 0.291 | | | |
| | Image plane 100 | Infinity | | | | |

FIG. 16

| Surface | K | $a_4$ | $a_6$ | $a_8$ | $a_{10}$ |
|---|---|---|---|---|---|
| 31 | 0.000000E+00 | -3.547396E-05 | 1.848475E-03 | 2.321103E-05 | 0.000000E+00 |
| 32 | 0.000000E+00 | 1.705741E-02 | 3.007815E-03 | -3.904594E-04 | 0.000000E+00 |
| 71 | 0.000000E+00 | 1.942191E-03 | -1.454298E-03 | -6.193375E-05 | 0.000000E+00 |
| 72 | 0.000000E+00 | -1.786991E-02 | 6.093893E-03 | -1.438607E-03 | 0.000000E+00 |
| 81 | 0.000000E+00 | -6.496048E-04 | 8.606198E-03 | -1.764104E-03 | 0.000000E+00 |
| 82 | 0.000000E+00 | -1.154689E-02 | 2.077492E-03 | -3.486052E-04 | 0.000000E+00 |
| 41 | 0.000000E+00 | 1.444966E-01 | -3.627605E-02 | 4.158561E-03 | 0.000000E+00 |
| 42 | 0.000000E+00 | 1.486335E-01 | -2.772002E-02 | 3.920044E-03 | 0.000000E+00 |
| 51 | 0.000000E+00 | -7.109961E-02 | -2.063224E-04 | 1.595557E-03 | 0.000000E+00 |
| 52 | 0.000000E+00 | -8.791939E-02 | 1.214065E-02 | -9.276299E-04 | 0.000000E+00 |
| 61 | 0.000000E+00 | -5.625674E-02 | 1.631394E-02 | -1.841480E-03 | 7.496092E-05 |
| 62 | 0.000000E+00 | -8.631427E-02 | 2.330019E-02 | -2.389694E-03 | 8.722604E-05 |

| Surface | $a_{12}$ |
|---|---|
| 31 | 0.000000E+00 |
| 32 | 0.000000E+00 |
| 71 | 0.000000E+00 |
| 72 | 0.000000E+00 |
| 81 | 0.000000E+00 |
| 82 | 0.000000E+00 |
| 41 | 0.000000E+00 |
| 42 | 0.000000E+00 |
| 51 | 0.000000E+00 |
| 52 | 0.000000E+00 |
| 61 | 0.000000E+00 |
| 62 | 0.000000E+00 |

FIG. 17A

| Variable gap | G1a | Gab | Gb2 | G23 | G34 | G4F |
|---|---|---|---|---|---|---|
| fG | 6.707 | 28.619 | 4.97 | 6.803 | 9.777 | 9 |
| EFL/(fG×F/#) | 0.700 | 0.164 | 0.945 | 0.690 | 0.480 | 0.522 |
| Shift range for focusing | 0.5126 | Incapable for focusing | 0.1506 | 0.4705 | 0.9032 | 0.834 |

FIG. 17B

| Fourth embodiment ||||||
|---|---|---|---|---|---|
| Effective focal length= 5.359 mm , HFOV = 22.5°, f-number= 1.978, System length= 5.325 mm, Image height= 2.317 mm ||||||
| Lens element | Surface | Radius of curvature(mm) | Thickness(mm) | Index of refraction | Dispersion coefficient | Focal length(mm) |
| Object | | Infinity | 1.000E+10 | | | |
| Aperture2 | | Infinity | -0.660 | | | |
| First lens element 3 | Object-side surface 31 | 1.656 | 0.782 | 1.545 | 55.987 | 3.821 |
| | Image-side surface 32 | 6.666 | 0.080 | | | |
| First additional lens element 7 | Object-side surface 71 | -34.464 | 0.200 | 1.642 | 22.409 | -5.286 |
| | Image-side surface 72 | 3.808 | 0.050 | | | |
| Second additional lens element 8 | Object-side surface 81 | 1.770 | 0.558 | 1.545 | 55.987 | 8.852 |
| | Image-side surface 82 | 2.481 | 0.417 | | | |
| Second lens element 4 | Object-side surface 41 | 5.648 | 0.383 | 1.642 | 22.409 | 48.252 |
| | Image-side surface 42 | 6.711 | 0.791 | | | |
| Third lens element 5 | Object-side surface 51 | -10.160 | 0.724 | 1.545 | 55.987 | -5.128 |
| | Image-side surface 52 | 3.965 | 0.194 | | | |
| Fourth lens element 6 | Object-side surface 61 | 6.099 | 0.297 | 1.642 | 22.409 | 36.880 |
| | Image-side surface 62 | 8.034 | 0.400 | | | |
| Filter 9 | Object-side surface 91 | Infinity | 0.210 | 1.517 | 64.167 | |
| | Image-side surface 92 | Infinity | 0.240 | | | |
| | Image plane 100 | Infinity | | | | |

FIG. 20

| Surface | K | $a_4$ | $a_6$ | $a_8$ | $a_{10}$ |
|---|---|---|---|---|---|
| 31 | 0.000000E+00 | -1.923739E-03 | 2.827599E-03 | -3.201722E-03 | 3.781208E-04 |
| 32 | 0.000000E+00 | -1.442536E-02 | 3.043332E-02 | 3.241243E-03 | -5.856490E-03 |
| 71 | 0.000000E+00 | 4.558657E-02 | 3.613968E-02 | -7.393145E-03 | -5.400406E-03 |
| 72 | 0.000000E+00 | -3.219172E-03 | 1.732090E-01 | -5.945628E-02 | -1.125868E-02 |
| 81 | 0.000000E+00 | -1.101302E-01 | 1.807314E-01 | -3.056414E-02 | -4.490931E-02 |
| 82 | 0.000000E+00 | -5.822610E-02 | 5.596665E-02 | -1.481275E-02 | 8.620436E-03 |
| 41 | 0.000000E+00 | -1.387936E-01 | -2.293206E-02 | 1.372130E-02 | 4.548996E-04 |
| 42 | 0.000000E+00 | -1.244156E-01 | 4.800077E-03 | 1.952697E-02 | -2.151952E-02 |
| 51 | 0.000000E+00 | -1.435265E-01 | -7.774632E-02 | 1.088466E-01 | -1.235872E-01 |
| 52 | 0.000000E+00 | -1.134033E-01 | 3.449804E-03 | 6.897956E-03 | -6.684984E-04 |
| 61 | 0.000000E+00 | -1.658471E-01 | 4.874773E-02 | 6.467301E-03 | -4.328238E-03 |
| 62 | 0.000000E+00 | -1.752074E-01 | 6.388186E-02 | -7.375085E-03 | 3.644167E-04 |
| Surface | $a_{12}$ | $a_{14}$ | $a_{16}$ | | |
| 31 | 0.000000E+00 | 0.000000E+00 | 0.000000E+00 | | |
| 32 | 0.000000E+00 | 0.000000E+00 | 0.000000E+00 | | |
| 71 | 0.000000E+00 | 0.000000E+00 | 0.000000E+00 | | |
| 72 | 0.000000E+00 | 0.000000E+00 | 0.000000E+00 | | |
| 81 | 2.464084E-02 | 0.000000E+00 | 0.000000E+00 | | |
| 82 | 1.235468E-02 | 0.000000E+00 | 0.000000E+00 | | |
| 41 | -2.511446E-02 | 0.000000E+00 | 0.000000E+00 | | |
| 42 | 6.752766E-03 | 0.000000E+00 | 0.000000E+00 | | |
| 51 | 3.091157E-02 | 4.197402E-02 | -2.670342E-02 | | |
| 52 | -8.418332E-04 | 2.120058E-04 | -4.567829E-05 | | |
| 61 | -4.959570E-04 | 2.205540E-04 | -3.227959E-05 | | |
| 62 | -3.302345E-04 | -1.178195E-04 | 3.846795E-05 | | |

FIG. 21A

| Variable gap | G1a | Gab | Gb2 | G23 | G34 | G4F |
|---|---|---|---|---|---|---|
| fG | 3.821 | 8.818 | 4.758 | 4.414 | 5.588 | 5.359 |
| EFL/(fG×F/#) | 0.709 | 0.307 | 0.570 | 0.614 | 0.485 | 0.506 |
| Shift range for focusing | | 0.1305 | Incapable for focusing | 0.1156 | 0.1734 | 0.3086 | 0.2976 |

FIG. 21B

| Fifth embodiment |||||||
|---|---|---|---|---|---|---|
| Effective focal length= 7.065 mm, HFOV = 22.5°, f-number= 1.966, System length= 5.747 mm, Image height= 2.120 mm |||||||
| Lens element | Surface | Radius of curvature(mm) | Thickness(mm) | Index of refraction | Dispersion coefficient | Focal length(mm) |
| Object | | Infinity | 1.000E+10 | | | |
| Aperture2 | | Infinity | -0.698 | | | |
| First lens element 3 | Object-side surface 31 | 1.642 | 1.027 | 1.545 | 55.987 | 5.128 |
| | Image-side surface 32 | 3.092 | 0.086 | | | |
| First additional lens element 7 | Object-side surface 71 | 64.922 | 0.170 | 1.642 | 22.409 | -15.892 |
| | Image-side surface 72 | 8.871 | 0.103 | | | |
| Second additional lens element 8 | Object-side surface 81 | 1.523 | 0.221 | 1.545 | 55.987 | -17.955 |
| | Image-side surface 82 | 1.251 | 0.398 | | | |
| Second lens element 4 | Object-side surface 41 | 4.941 | 0.356 | 1.642 | 22.409 | 14.838 |
| | Image-side surface 42 | 9.887 | 0.912 | | | |
| Third lens element 5 | Object-side surface 51 | 4.541 | 0.671 | 1.545 | 55.987 | 7.883 |
| | Image-side surface 52 | -79.057 | 0.135 | | | |
| Fourth lens element 6 | Object-side surface 61 | -2.735 | 0.820 | 1.642 | 22.409 | -4.216 |
| | Image-side surface 62 | 1386.521 | 0.400 | | | |
| Filter 9 | Object-side surface 91 | Infinity | 0.210 | 1.517 | 64.167 | |
| | Image-side surface 92 | Infinity | 0.240 | | | |
| | Image plane 100 | Infinity | | | | |

FIG. 24

| Surface | K | $a_4$ | $a_6$ | $a_8$ | $a_{10}$ |
|---|---|---|---|---|---|
| 31 | 0.000000E+00 | 2.177902E-02 | -3.289419E-02 | 2.081018E-02 | -4.441590E-03 |
| 32 | 0.000000E+00 | -1.504371E-01 | 7.457660E-02 | -3.228969E-02 | 8.316279E-03 |
| 71 | 0.000000E+00 | 7.546339E-02 | -4.471821E-02 | -3.154087E-02 | 2.281017E-02 |
| 72 | 0.000000E+00 | 2.288402E-01 | 7.220535E-02 | -2.353354E-01 | 9.614468E-02 |
| 81 | 0.000000E+00 | -8.669674E-02 | 7.412502E-02 | 4.119865E-02 | -2.933590E-01 |
| 82 | 0.000000E+00 | -2.540753E-01 | 3.350688E-01 | -2.808607E-01 | -1.388926E-01 |
| 41 | 0.000000E+00 | 1.724372E-02 | -3.397880E-01 | 7.018962E-01 | -6.481065E-01 |
| 42 | 0.000000E+00 | -1.119564E-01 | 5.948115E-02 | 2.736221E-03 | -6.254646E-02 |
| 51 | 0.000000E+00 | -1.057918E-02 | -2.521019E-01 | 2.734412E-01 | -1.931380E-01 |
| 52 | 0.000000E+00 | 6.424456E-02 | -1.308067E-01 | 4.718513E-02 | -1.801722E-03 |
| 61 | 0.000000E+00 | 8.512378E-02 | 4.766334E-03 | -2.125892E-02 | 4.687016E-03 |
| 62 | 0.000000E+00 | -3.266797E-02 | 1.489378E-02 | 4.097904E-03 | -2.781977E-03 |
| Surface | $a_{12}$ | $a_{14}$ | $a_{16}$ | | |
| 31 | 0.000000E+00 | 0.000000E+00 | 0.000000E+00 | | |
| 32 | 0.000000E+00 | 0.000000E+00 | 0.000000E+00 | | |
| 71 | 0.000000E+00 | 0.000000E+00 | 0.000000E+00 | | |
| 72 | 0.000000E+00 | 0.000000E+00 | 0.000000E+00 | | |
| 81 | 1.220299E-01 | 0.000000E+00 | 0.000000E+00 | | |
| 82 | 1.128759E-01 | 0.000000E+00 | 0.000000E+00 | | |
| 41 | 2.009340E-01 | 0.000000E+00 | 0.000000E+00 | | |
| 42 | 3.552620E-02 | 0.000000E+00 | 0.000000E+00 | | |
| 51 | 6.331112E-02 | 3.553248E-04 | -3.062455E-03 | | |
| 52 | -7.709847E-03 | 3.728287E-03 | -5.831911E-04 | | |
| 61 | 2.797028E-03 | -1.509688E-03 | 2.038352E-04 | | |
| 62 | 9.544154E-05 | 1.062907E-04 | -1.199628E-05 | | |

FIG. 25A

| Variable gap | G1a | Gab | Gb2 | G23 | G34 | G4F |
|---|---|---|---|---|---|---|
| fG | 5.128 | 6.734 | 8.526 | 6.218 | 4.649 | 7.065 |
| EFL/(fG×F/#) | 0.701 | 0.534 | 0.422 | 0.578 | 0.773 | 0.509 |
| Shift range for focusing | 0.0404 | Incapable for focusing | Incapable for focusing | Incapable for focusing | 0.1049 | 0.241 |

FIG. 25B

| Sixth embodiment | | | | | | |
|---|---|---|---|---|---|---|
| Effective focal length=8.732 mm, HFOV =20°, f-number=2.096, System length=5.256 mm, Image height=2.116 mm | | | | | | |
| Lens element | Surface | Radius of curvature(mm) | Thickness(mm) | Index of refraction | Dispersion coefficient | Focal length(mm) |
| Object | | Infinity | 1.000E+10 | | | |
| Aperture2 | | Infinity | -0.687 | | | |
| First lens element 3 | Object-side surface 31 | 1.641 | 0.801 | 1.545 | 55.987 | 3.661 |
| | Image-side surface 32 | 7.572 | 0.102 | | | |
| First additional lens element 7 | Object-side surface 71 | -12.140 | 0.094 | 1.642 | 22.409 | -5.913 |
| | Image-side surface 72 | 5.608 | 0.047 | | | |
| Second additional lens element 8 | Object-side surface 81 | 1.860 | 0.587 | 1.545 | 55.987 | 8.688 |
| | Image-side surface 82 | 2.719 | 0.369 | | | |
| Second lens element 4 | Object-side surface 41 | 4.213 | 0.301 | 1.642 | 22.409 | -73.974 |
| | Image-side surface 42 | 3.763 | 0.925 | | | |
| Third lens element 5 | Object-side surface 51 | -3.572 | 0.097 | 1.545 | 55.987 | -5.708 |
| | Image-side surface 52 | 24.754 | 0.049 | | | |
| Fourth lens element 6 | Object-side surface 61 | -15.112 | 1.035 | 1.642 | 22.409 | -65.618 |
| | Image-side surface 62 | -24.090 | 0.400 | | | |
| Filter 9 | Object-side surface 91 | Infinity | 0.210 | 1.517 | 64.167 | |
| | Image-side surface 92 | Infinity | 0.240 | | | |
| | Image plane 100 | Infinity | | | | |

FIG. 28

| Surface | K | $a_4$ | $a_6$ | $a_8$ | $a_{10}$ |
|---|---|---|---|---|---|
| 31 | 0.000000E+00 | -9.536758E-03 | 1.743672E-02 | -1.085880E-02 | 2.366127E-03 |
| 32 | 0.000000E+00 | 1.734160E-03 | 3.217711E-02 | 4.337825E-03 | -5.063803E-03 |
| 71 | 0.000000E+00 | 8.058611E-02 | 4.750287E-02 | -5.783178E-03 | -8.882015E-03 |
| 72 | 0.000000E+00 | -1.007768E-02 | 2.011689E-01 | -3.532877E-02 | -2.654746E-02 |
| 81 | 0.000000E+00 | -1.633978E-01 | 2.538992E-01 | -4.852308E-02 | -6.077538E-02 |
| 82 | 0.000000E+00 | -8.887348E-02 | 1.090714E-01 | -7.836933E-02 | 2.380800E-02 |
| 41 | 0.000000E+00 | -1.587737E-01 | -1.239972E-03 | 3.163383E-02 | -1.222619E-01 |
| 42 | 0.000000E+00 | -1.185277E-01 | 6.717439E-02 | -1.158317E-01 | 5.987445E-02 |
| 51 | 0.000000E+00 | -2.347356E-01 | -5.197511E-02 | 2.565795E-02 | -1.332453E-02 |
| 52 | 0.000000E+00 | -1.735993E-01 | -1.863774E-02 | 3.452421E-02 | -9.388378E-03 |
| 61 | 0.000000E+00 | -8.921535E-02 | 4.728605E-02 | -4.843784E-02 | 2.739721E-04 |
| 62 | 0.000000E+00 | -9.685950E-02 | 3.283333E-02 | -8.194875E-03 | 4.034740E-04 |
| Surface | $a_{12}$ | $a_{14}$ | $a_{16}$ | | |
| 31 | 0.000000E+00 | 0.000000E+00 | 0.000000E+00 | | |
| 32 | 0.000000E+00 | 0.000000E+00 | 0.000000E+00 | | |
| 71 | 0.000000E+00 | 0.000000E+00 | 0.000000E+00 | | |
| 72 | 0.000000E+00 | 0.000000E+00 | 0.000000E+00 | | |
| 81 | 3.184628E-02 | 0.000000E+00 | 0.000000E+00 | | |
| 82 | 1.050722E-02 | 0.000000E+00 | 0.000000E+00 | | |
| 41 | 5.847985E-02 | 0.000000E+00 | 0.000000E+00 | | |
| 42 | -7.341551E-04 | 0.000000E+00 | 0.000000E+00 | | |
| 51 | -6.361079E-02 | 6.746835E-02 | -1.465483E-02 | | |
| 52 | -1.334557E-02 | -7.877564E-05 | 4.164280E-03 | | |
| 61 | 1.039841E-02 | 2.125724E-03 | -5.432601E-03 | | |
| 62 | 1.070027E-04 | 1.569669E-05 | -1.532320E-05 | | |

FIG. 29A

| Variable gap | G1a | Gab | Gb2 | G23 | G34 | G4F |
|---|---|---|---|---|---|---|
| fG | 3.661 | 7.161 | 4.165 | 4.163 | 5.176 | 5.372 |
| EFL/(fG×F/#) | 0.699 | 0.357 | 0.614 | 0.614 | 0.494 | 0.476 |
| Shift range for focusing | 0.1089 | Incapable for focusing | 0.0848 | 0.1711 | 0.281 | 0.3278 |

FIG. 29B

| Seventh embodiment ||||||
|---|---|---|---|---|---|
| Effective focal length=5.364 mm , HFOV =20.000°, f-number=2.160, System length=5.339 mm, Image height=2.127 mm ||||||
| Lens element | Surface | Radius of curvature(mm) | Thickness(mm) | Index of refraction | Dispersion coefficient | Focal length(mm) |
| Object | | Infinity | 1.000E+10 | | | |
| Aperture2 | | Infinity | -0.646 | | | |
| First lens element 3 | Object-side surface 31 | 1.712 | 0.754 | 1.545 | 55.987 | 3.547 |
| | Image-side surface 32 | 12.429 | 0.127 | | | |
| First additional lens element 7 | Object-side surface 71 | -7.545 | 0.198 | 1.642 | 22.409 | -5.441 |
| | Image-side surface 72 | 6.675 | 0.046 | | | |
| Second additional lens element 8 | Object-side surface 81 | 2.249 | 0.457 | 1.545 | 55.987 | 20.098 |
| | Image-side surface 82 | 2.625 | 0.372 | | | |
| Second lens element 4 | Object-side surface 41 | 2.669 | 0.198 | 1.642 | 22.409 | 18.915 |
| | Image-side surface 42 | 3.313 | 1.661 | | | |
| Third lens element 5 | Object-side surface 51 | -4.502 | 0.280 | 1.545 | 55.987 | -6.039 |
| | Image-side surface 52 | 12.615 | 0.046 | | | |
| Fourth lens element 6 | Object-side surface 61 | 10.739 | 0.349 | 1.642 | 22.409 | -31.373 |
| | Image-side surface 62 | 6.935 | 0.400 | | | |
| Filter 9 | Object-side surface 91 | Infinity | 0.210 | 1.517 | 64.167 | |
| | Image-side surface 92 | Infinity | 0.240 | | | |
| | Image plane 100 | Infinity | | | | |

FIG. 32

| Surface | K | $a_4$ | $a_6$ | $a_8$ | $a_{10}$ |
|---|---|---|---|---|---|
| 31 | 0.000000E+00 | -7.816898E-03 | 1.382187E-02 | -8.459884E-03 | 2.130896E-03 |
| 32 | 0.000000E+00 | 9.768586E-03 | 3.159189E-02 | 3.670264E-03 | -5.809321E-03 |
| 71 | 0.000000E+00 | 6.510872E-02 | 4.638629E-02 | -8.962223E-03 | -6.403035E-03 |
| 72 | 0.000000E+00 | -1.676157E-02 | 1.918896E-01 | -3.698279E-02 | -2.204888E-02 |
| 81 | 0.000000E+00 | -1.400127E-01 | 2.406543E-01 | -5.106867E-02 | -4.840682E-02 |
| 82 | 0.000000E+00 | -8.161327E-02 | 9.198297E-02 | -5.530591E-02 | 7.109691E-03 |
| 41 | 0.000000E+00 | -1.939633E-01 | 1.027194E-02 | 3.544195E-02 | -1.194655E-01 |
| 42 | 0.000000E+00 | -1.603734E-01 | 4.872431E-02 | -5.003417E-02 | -9.731843E-03 |
| 51 | 0.000000E+00 | -2.485742E-01 | -1.485686E-02 | 1.000758E-02 | -2.907291E-02 |
| 52 | 0.000000E+00 | -1.915146E-01 | 2.310807E-02 | 6.216664E-03 | -1.583517E-03 |
| 61 | 0.000000E+00 | -6.592719E-02 | 3.237977E-02 | -3.770256E-03 | -8.359380E-04 |
| 62 | 0.000000E+00 | -8.872570E-02 | 3.071040E-02 | -3.128630E-03 | -3.067171E-04 |
| Surface | $a_{12}$ | $a_{14}$ | $a_{16}$ | | |
| 31 | 0.000000E+00 | 0.000000E+00 | 0.000000E+00 | | |
| 32 | 0.000000E+00 | 0.000000E+00 | 0.000000E+00 | | |
| 71 | 0.000000E+00 | 0.000000E+00 | 0.000000E+00 | | |
| 72 | 0.000000E+00 | 0.000000E+00 | 0.000000E+00 | | |
| 81 | 2.534746E-02 | 0.000000E+00 | 0.000000E+00 | | |
| 82 | 1.283709E-02 | 0.000000E+00 | 0.000000E+00 | | |
| 41 | 5.469519E-02 | 0.000000E+00 | 0.000000E+00 | | |
| 42 | 1.918000E-02 | 0.000000E+00 | 0.000000E+00 | | |
| 51 | 6.005775E-03 | 5.482756E-03 | -2.522689E-03 | | |
| 52 | -1.411322E-03 | 6.781971E-04 | -6.544037E-05 | | |
| 61 | 4.260323E-05 | 4.548747E-05 | -4.547165E-06 | | |
| 62 | 9.836903E-06 | 8.678150E-07 | 1.579640E-06 | | |

FIG. 33A

| Variable gap | G1a | Gab | Gb2 | G23 | G34 | G4F |
|---|---|---|---|---|---|---|
| fG | 3.547 | 7.32 | 5.445 | 4.538 | 5.322 | 5.364 |
| EFL/(fG×F/#) | 0.700 | 0.339 | 0.456 | 0.547 | 0.467 | 0.463 |
| Shift range for focusing | | Incapable for focusing | | Incapable for focusing | Incapable for focusing | |
| | 0.0573 | | 0.0687 | | | 0.1605 |

FIG. 33B

| Eighth embodiment ||||||
| --- | --- | --- | --- | --- | --- |
| Effective focal length=5.328 mm, HFOV = 20°, f-number=2.294, System length=5.318 mm, Image height=2.192 mm ||||||
| Lens element | Surface | Radius of curvature(mm) | Thickness(mm) | Index of refraction | Dispersion coefficient | Focal length(mm) |
| Object | | Infinity | 1.000E+10 | | | |
| Aperture2 | | Infinity | -0.704 | | | |
| First lens element 3 | Object-side surface 31 | 1.598 | 0.739 | 1.545 | 55.987 | 3.316 |
| | Image-side surface 32 | 11.370 | 0.126 | | | |
| First additional lens element 7 | Object-side surface 71 | -5.498 | 0.143 | 1.642 | 22.409 | -5.445 |
| | Image-side surface 72 | 9.920 | 0.089 | | | |
| Second additional lens element 8 | Object-side surface 81 | 1.929 | 0.476 | 1.545 | 55.987 | 9.814 |
| | Image-side surface 82 | 2.751 | 0.491 | | | |
| Second lens element 4 | Object-side surface 41 | 5.506 | 0.208 | 1.642 | 22.409 | -37.626 |
| | Image-side surface 42 | 4.424 | 1.064 | | | |
| Third lens element 5 | Object-side surface 51 | -1523.668 | 0.143 | 1.545 | 55.987 | -5.785 |
| | Image-side surface 52 | 3.167 | 0.203 | | | |
| Fourth lens element 6 | Object-side surface 61 | -29.603 | 0.786 | 1.642 | 22.409 | -13.353 |
| | Image-side surface 62 | 12.335 | 0.400 | | | |
| Filter 9 | Object-side surface 91 | Infinity | 0.210 | 1.517 | 64.167 | |
| | Image-side surface 92 | Infinity | 0.240 | | | |
| | Image plane 100 | Infinity | | | | |

FIG. 36

| Surface | K | $a_4$ | $a_6$ | $a_8$ | $a_{10}$ |
|---|---|---|---|---|---|
| 31 | 0.000000E+00 | -1.964195E-02 | 2.555157E-02 | -1.741415E-02 | 4.216200E-03 |
| 32 | 0.000000E+00 | 2.468564E-03 | 3.344140E-02 | 4.681580E-03 | -6.542530E-03 |
| 71 | 0.000000E+00 | 8.820092E-02 | 4.870176E-02 | -6.332501E-03 | -9.672503E-03 |
| 72 | 0.000000E+00 | -1.567249E-02 | 1.951928E-01 | -2.692473E-02 | -2.586863E-02 |
| 81 | 0.000000E+00 | -1.923564E-01 | 2.905631E-01 | -6.645823E-02 | -5.408681E-02 |
| 82 | 0.000000E+00 | -6.504941E-02 | 8.141569E-02 | -2.506986E-02 | -4.281548E-03 |
| 41 | 0.000000E+00 | -2.112979E-01 | 4.635909E-02 | -1.456509E-02 | -7.125643E-02 |
| 42 | 0.000000E+00 | -1.650915E-01 | 5.706307E-02 | -1.866484E-02 | -1.964295E-02 |
| 51 | 0.000000E+00 | -3.403866E-01 | 3.657274E-02 | -1.518332E-01 | 5.744456E-02 |
| 52 | 0.000000E+00 | -3.086643E-01 | 3.699550E-02 | 1.282562E-02 | -1.653869E-04 |
| 61 | 0.000000E+00 | -2.232775E-01 | 1.604466E-01 | -5.794616E-02 | 9.891722E-04 |
| 62 | 0.000000E+00 | -2.435363E-01 | 1.132018E-01 | -2.800464E-02 | 1.843375E-03 |

| Surface | $a_{12}$ | $a_{14}$ | $a_{16}$ |
|---|---|---|---|
| 31 | 0.000000E+00 | 0.000000E+00 | 0.000000E+00 |
| 32 | 0.000000E+00 | 0.000000E+00 | 0.000000E+00 |
| 71 | 0.000000E+00 | 0.000000E+00 | 0.000000E+00 |
| 72 | 0.000000E+00 | 0.000000E+00 | 0.000000E+00 |
| 81 | 3.262472E-02 | 0.000000E+00 | 0.000000E+00 |
| 82 | 1.042482E-02 | 0.000000E+00 | 0.000000E+00 |
| 41 | 4.753293E-02 | 0.000000E+00 | 0.000000E+00 |
| 42 | 3.395240E-02 | 0.000000E+00 | 0.000000E+00 |
| 51 | 6.949016E-02 | 5.693516E-03 | -3.901943E-02 |
| 52 | 1.310725E-02 | -1.320731E-02 | 2.270212E-03 |
| 61 | 6.725396E-04 | 3.116901E-03 | -1.704471E-03 |
| 62 | 2.402730E-04 | 3.032610E-05 | -2.924299E-05 |

FIG. 37A

| Variable gap | G1a | Gab | Gb2 | G23 | G34 | G4F |
|---|---|---|---|---|---|---|
| fG | 3.315 | 6.386 | 4.093 | 4.261 | 5.092 | 5.328 |
| EFL/(fG×F/#) | 0.701 | 0.424 | 0.662 | 0.636 | 0.532 | 0.509 |
| Shift range for focusing | 0.1151 | Incapable for focusing | 0.0966 | 0.2027 | 0.2819 | 0.3672 |

FIG. 37B

| Ninth embodiment ||||||
|---|---|---|---|---|---|
| Effective focal length=8.995 mm , HFOV =17.735°, f-number=2.019, System length=7.835 mm, Image height=2.944 mm ||||||
| Lens element | Surface | Radius of curvature(mm) | Thickness(mm) | Index of refraction | Dispersion coefficient | Focal length(mm) |
| Object | | Infinity | 1.000E+10 | | | |
| Aperture2 | | Infinity | -1.190 | | | |
| First lens element 3 | Object-side surface 31 | 2.526 | 1.395 | 1.545 | 55.987 | 6.363 |
| | Image-side surface 32 | 7.436 | 0.055 | | | |
| First additional lens element 7 | Object-side surface 71 | 18.571 | 0.241 | 1.642 | 22.409 | -7.031 |
| | Image-side surface 72 | 3.637 | 0.039 | | | |
| Second additional lens element 8 | Object-side surface 81 | 2.264 | 1.084 | 1.545 | 55.987 | 6.071 |
| | Image-side surface 82 | 5.925 | 1.069 | | | |
| Second lens element 4 | Object-side surface 41 | -10.301 | 0.252 | 1.545 | 55.987 | -6.746 |
| | Image-side surface 42 | 5.788 | 1.002 | | | |
| Third lens element 5 | Object-side surface 51 | -16.699 | 0.574 | 1.642 | 22.409 | 11.958 |
| | Image-side surface 52 | -5.361 | 0.645 | | | |
| Fourth lens element 6 | Object-side surface 61 | -3.022 | 0.576 | 1.545 | 55.987 | -5.800 |
| | Image-side surface 62 | -69.534 | 0.400 | | | |
| Filter 9 | Object-side surface 91 | Infinity | 0.210 | 1.517 | 64.167 | |
| | Image-side surface 92 | Infinity | 0.292 | | | |
| | Image plane 100 | Infinity | | | | |

FIG. 40

| Surface | K | $a_4$ | $a_6$ | $a_8$ | $a_{10}$ |
|---|---|---|---|---|---|
| 31 | 0.000000E+00 | -2.641749E-05 | -1.795982E-04 | -1.038389E-04 | 0.000000E+00 |
| 32 | 0.000000E+00 | 7.497351E-03 | -4.581890E-04 | -1.429529E-04 | 0.000000E+00 |
| 71 | 0.000000E+00 | 3.636378E-02 | -3.759964E-03 | -3.636831E-04 | 0.000000E+00 |
| 72 | 0.000000E+00 | 4.085472E-02 | 5.343725E-03 | -2.393715E-03 | 0.000000E+00 |
| 81 | 0.000000E+00 | 2.408034E-03 | 2.186155E-03 | -8.162672E-04 | 0.000000E+00 |
| 82 | 0.000000E+00 | -1.124112E-02 | -2.019701E-03 | 3.525410E-04 | 0.000000E+00 |
| 41 | 0.000000E+00 | -1.002564E-01 | 3.961140E-02 | -1.146794E-02 | 0.000000E+00 |
| 42 | 0.000000E+00 | -5.983477E-02 | 4.084772E-02 | -6.434870E-03 | 0.000000E+00 |
| 51 | 0.000000E+00 | 9.413917E-03 | -1.504468E-02 | 2.276789E-03 | 0.000000E+00 |
| 52 | 0.000000E+00 | 2.130566E-02 | -1.772771E-02 | 2.299887E-03 | 0.000000E+00 |
| 61 | 0.000000E+00 | -5.318340E-02 | 1.852760E-02 | -1.787293E-03 | 7.392580E-05 |
| 62 | 0.000000E+00 | -1.318424E-01 | 4.094003E-02 | -5.464794E-03 | 2.702513E-04 |

FIG. 41A

| Variable gap | G1a | Gab | Gb2 | G23 | G34 | G4F |
|---|---|---|---|---|---|---|
| fG | 6.363 | 20.831 | 5.634 | 8.415 | 7.332 | 8.995 |
| EFL/(fG×F/#) | 0.700 | 0.214 | 0.791 | 0.530 | 0.608 | 0.495 |
| Shift range for focusing | 0.2836 | Incapable for focusing | 0.1802 | 0.1734 | 0.5149 | 0.827 |

FIG. 41B

| Tenth embodiment | | | | | | |
|---|---|---|---|---|---|---|
| Effective focal length=5.217 mm , HFOV =12.5°, f-number=1.928, System length=4.856 mm, Image height=1.087 mm | | | | | | |
| Lens element | Surface | Radius of curvature(mm) | Thickness(mm) | Index of refraction | Dispersion coefficient | Focal length(mm) |
| Object | | Infinity | 1.000E+10 | | | |
| Aperture2 | | Infinity | -0.770 | | | |
| First lens element 3 | Object-side surface 31 | 1.403 | 0.415 | 1.545 | 55.987 | 3.865 |
| | Image-side surface 32 | 3.747 | 0.050 | | | |
| First additional lens element 7 | Object-side surface 71 | 2.077 | 0.147 | 1.661 | 20.401 | -5.777 |
| | Image-side surface 72 | 1.311 | 0.238 | | | |
| Second additional lens element 8 | Object-side surface 81 | 2.294 | 0.708 | 1.545 | 55.987 | 6.715 |
| | Image-side surface 82 | 5.456 | 0.562 | | | |
| Second lens element 4 | Object-side surface 41 | -16.642 | 0.252 | 1.661 | 20.401 | -134.816 |
| | Image-side surface 42 | -20.549 | 0.852 | | | |
| Third lens element 5 | Object-side surface 51 | -6.017 | 0.148 | 1.545 | 55.987 | -22.724 |
| | Image-side surface 52 | -11.779 | 0.290 | | | |
| Fourth lens element 6 | Object-side surface 61 | -3.879 | 0.345 | 1.661 | 20.401 | -6.581 |
| | Image-side surface 62 | -34.743 | 0.403 | | | |
| Filter 9 | Object-side surface 91 | Infinity | 0.210 | 1.517 | 64.167 | |
| | Image-side surface 92 | Infinity | 0.237 | | | |
| | Image plane 100 | Infinity | | | | |

FIG. 44

| Surface | K | $a_4$ | $a_6$ | $a_8$ | $a_{10}$ |
|---|---|---|---|---|---|
| 31 | 0.000000E+00 | -2.219404E-02 | 5.013430E-04 | -7.462974E-03 | 6.051393E-03 |
| 32 | 0.000000E+00 | 1.212272E-01 | -4.901682E-02 | -5.745730E-02 | 8.771511E-02 |
| 71 | 0.000000E+00 | 2.693556E-01 | -3.643932E-01 | 1.271151E-01 | 7.238312E-02 |
| 72 | 0.000000E+00 | 3.195090E-01 | -5.969222E-01 | 3.384544E-01 | 2.742864E-02 |
| 81 | 0.000000E+00 | 1.689134E-01 | -2.221440E-01 | 2.113677E-01 | -9.249416E-02 |
| 82 | 0.000000E+00 | -2.004206E-02 | 1.587931E-02 | -8.449064E-02 | 8.976840E-02 |
| 41 | 0.000000E+00 | -2.142277E-02 | -7.027217E-01 | 1.540484E+00 | -2.285184E+00 |
| 42 | 0.000000E+00 | -7.311408E-02 | -1.794411E-01 | 4.290432E-01 | -6.797656E-01 |
| 51 | 0.000000E+00 | -2.754866E-02 | -5.566430E-01 | 6.140533E-01 | -2.873289E-01 |
| 52 | 0.000000E+00 | 1.124197E-01 | -5.696073E-01 | 6.250734E-01 | -4.112792E-01 |
| 61 | 0.000000E+00 | 1.380075E-01 | -6.531975E-02 | 8.112506E-03 | 1.814574E-03 |
| 62 | 0.000000E+00 | -3.255300E-02 | 4.104341E-02 | -1.846498E-02 | 2.679608E-03 |

| Surface | $a_{12}$ | $a_{14}$ | $a_{16}$ |
|---|---|---|---|
| 31 | 0.000000E+00 | 0.000000E+00 | 0.000000E+00 |
| 32 | -2.065641E-02 | 0.000000E+00 | 0.000000E+00 |
| 71 | -4.218696E-02 | 0.000000E+00 | 0.000000E+00 |
| 72 | -6.882454E-02 | 0.000000E+00 | 0.000000E+00 |
| 81 | 1.851030E-02 | 0.000000E+00 | 0.000000E+00 |
| 82 | -7.391471E-02 | 3.054874E-02 | 0.000000E+00 |
| 41 | 1.652303E+00 | -5.111033E-01 | 0.000000E+00 |
| 42 | 5.368301E-01 | -1.540475E-01 | 0.000000E+00 |
| 51 | -9.558692E-02 | 1.625010E-01 | -4.468022E-02 |
| 52 | 1.378934E-01 | -1.190678E-02 | -1.943931E-03 |
| 61 | -1.182545E-04 | -9.139184E-05 | 8.053740E-06 |
| 62 | -6.203395E-05 | 7.614427E-05 | -1.745089E-05 |

FIG. 45A

| Variable gap | G1a | Gab | Gb2 | G23 | G34 | G4F |
|---|---|---|---|---|---|---|
| fG | 3.865 | 8.506 | 4.113 | 4.202 | 4.463 | 5.217 |
| EFL/(fG×F/#) | 0.700 | 0.318 | 0.658 | 0.644 | 0.607 | 0.519 |
| Shift range for focusing | 0.017 | Incapable for focusing | 0.0348 | 0.0421 | 0.0691 | 0.1078 |

FIG. 45B

| Condition expression | First embodiment | Second embodiment | Third embodiment | Fourth embodiment | Fifth embodiment |
|---|---|---|---|---|---|
| T1 | 1.26 | 1.46 | 0.77 | 0.78 | 1.03 |
| G12 | 0.17 | 1.77 | 3.06 | 1.30 | 0.98 |
| T2 | 0.23 | 0.30 | 0.24 | 0.38 | 0.36 |
| G23 | 1.98 | 1.77 | 1.53 | 0.79 | 0.91 |
| T3 | 0.70 | 0.52 | 0.29 | 0.72 | 0.67 |
| G34 | 0.08 | 0.13 | 0.34 | 0.19 | 0.14 |
| T4 | 0.75 | 0.40 | 0.82 | 0.30 | 0.82 |
| G4F | 0.40 | 0.40 | 0.40 | 0.40 | 0.40 |
| TF | 0.21 | 0.21 | 0.21 | 0.21 | 0.21 |
| GFP | 0.60 | 0.98 | 0.29 | 0.24 | 0.24 |
| BFL | 1.21 | 1.59 | 0.90 | 0.85 | 0.85 |
| ALT | 2.94 | 2.68 | 2.12 | 2.19 | 2.87 |
| AAG | 2.23 | 3.66 | 4.94 | 2.29 | 2.02 |
| TL | 5.17 | 6.35 | 7.06 | 4.47 | 4.90 |
| TTL | 6.38 | 7.94 | 7.96 | 5.33 | 5.75 |
| (TTL×F/#)/EFL | 2.25 | 2.11 | 1.69 | 1.96 | 1.60 |
| EFL/TTL | 1.11 | 1.10 | 1.13 | 1.01 | 1.23 |
| EFL/ALT | 2.41 | 3.24 | 4.25 | 2.45 | 2.46 |
| (BFL×F/#)/T1 | 2.39 | 2.52 | 2.24 | 2.15 | 1.63 |
| (BFL×F/#)/AAG | 1.36 | 1.00 | 0.35 | 0.73 | 0.83 |
| (BFL×F/#)/(|G23-G34|) | 1.60 | 2.24 | 1.45 | 2.82 | 2.15 |
| (T2+T3+T4)/T1 | 1.32 | 0.84 | 1.75 | 1.80 | 1.80 |
| ((T2+T3+T4)×F/#)/AAG | 1.87 | 0.77 | 0.52 | 1.21 | 1.79 |
| ((T2+T3+T4)×F/#)/|G23-G34| | 2.20 | 1.72 | 2.17 | 4.65 | 4.67 |
| ((T2+T3+T4)×F/#)/(T2+G23+T3+G34+T4) | 1.12 | 0.90 | 0.80 | 1.16 | 1.25 |
| ((T2+T3)×F/#)/T1 | 1.82 | 1.30 | 1.31 | 2.80 | 1.96 |
| ((T2+T3)×F/#)/AAG | 1.03 | 0.52 | 0.21 | 0.96 | 1.00 |
| ((T2+T3)×F/#)/|G23-G34| | 1.22 | 1.16 | 0.85 | 3.67 | 2.60 |
| ((T2+T4)×F/#)/T1 | 1.92 | 1.10 | 2.62 | 1.72 | 2.25 |
| ((T2+T4)F/#)/AAG | 1.09 | 0.44 | 0.41 | 0.59 | 1.14 |
| ((T2+T4)F/#)/|G23-G34| | 1.28 | 0.98 | 1.70 | 2.25 | 2.97 |

FIG. 46

| Condition expression | Sixth embodiment | Seventh embodiment | Eighth embodiment | Ninth embodiment | Tenth embodiment |
|---|---|---|---|---|---|
| T1 | 0.80 | 0.75 | 0.74 | 1.40 | 0.42 |
| G12 | 1.20 | 1.20 | 1.32 | 2.49 | 1.70 |
| T2 | 0.30 | 0.20 | 0.21 | 0.25 | 0.25 |
| G23 | 0.92 | 1.66 | 1.06 | 1.00 | 0.85 |
| T3 | 0.10 | 0.28 | 0.14 | 0.57 | 0.15 |
| G34 | 0.05 | 0.05 | 0.20 | 0.65 | 0.29 |
| T4 | 1.04 | 0.35 | 0.79 | 0.58 | 0.35 |
| G4F | 0.40 | 0.40 | 0.40 | 0.40 | 0.40 |
| TF | 0.21 | 0.21 | 0.21 | 0.21 | 0.21 |
| GFP | 0.24 | 0.24 | 0.24 | 0.29 | 0.24 |
| BFL | 0.85 | 0.85 | 0.85 | 0.90 | 0.85 |
| ALT | 2.23 | 1.58 | 1.88 | 2.80 | 1.16 |
| AAG | 2.17 | 2.91 | 2.59 | 4.13 | 2.85 |
| TL | 4.41 | 4.49 | 4.47 | 6.93 | 4.01 |
| TTL | 5.26 | 5.34 | 5.32 | 7.83 | 4.86 |
| (TTL×F/#)/EFL | 2.05 | 2.15 | 2.29 | 1.76 | 1.79 |
| EFL/TTL | 1.02 | 1.00 | 1.00 | 1.15 | 1.07 |
| EFL/ALT | 2.40 | 3.39 | 2.84 | 3.22 | 4.50 |
| (BFL×F/#)/T1 | 2.22 | 2.43 | 2.64 | 1.31 | 3.95 |
| (BFL×F/#)/AAG | 0.82 | 0.63 | 0.75 | 0.44 | 0.58 |
| (BFL×F/#)/(|G23-G34|) | 2.03 | 1.14 | 2.27 | 5.12 | 2.92 |
| (T2+T3+T4)/T1 | 1.79 | 1.10 | 1.54 | 1.01 | 1.80 |
| ((T2+T3+T4)×F/#)/AAG | 1.38 | 0.61 | 1.01 | 0.68 | 0.50 |
| ((T2+T3+T4)×F/#)/|G23-G34| | 3.43 | 1.11 | 3.03 | 7.95 | 2.56 |
| ((T2+T3+T4)×F/#)/(T2+G23+T3+G34+T4) | 1.25 | 0.70 | 1.08 | 0.93 | 0.76 |
| ((T2+T3)×F/#)/T1 | 1.04 | 1.37 | 1.09 | 1.20 | 1.86 |
| ((T2+T3)×F/#)/AAG | 0.38 | 0.36 | 0.31 | 0.40 | 0.27 |
| ((T2+T3)×F/#)/|G23-G34| | 0.95 | 0.64 | 0.94 | 4.69 | 1.37 |
| ((T2+T4)×F/#)/T1 | 3.50 | 1.56 | 3.09 | 1.20 | 2.77 |
| ((T2+T4)F/#)/AAG | 1.29 | 0.41 | 0.88 | 0.40 | 0.40 |
| ((T2+T4)F/#)/|G23-G34| | 3.20 | 0.73 | 2.65 | 4.70 | 2.05 |

FIG. 47

OPTICAL IMAGING LENS

CROSS-REFERENCE TO RELATED APPLICATION

This application claims the priority benefit of Chinese application serial no. 201610388133.X, filed on Jun. 2, 2016. The entirety of the above-mentioned patent application is hereby incorporated by reference herein and made a part of this specification.

BACKGROUND OF THE INVENTION

1. Field of the Invention

The invention generally relates to optical lens, in particular, to optical imaging lens.

2. Description of Related Art

The specification of the consumer electronic products, such as mobile phone, camera, tablet computer, personal digital assistant, car video apparatus et al., are ever-change. In addition, the pace for pursuit of short and light products is never slowed down. Therefore, the critical elements of the electronic products such as the optical element and so on, need to be continuously improved in specification to satisfy the requirement of consumer. The essential features of the optical lens are nothing more than the imaging quality and the volume. To the feature of imaging quality, as the development of image sensing technology, consumers accordingly require more for the imaging quality. Therefore in the field of designing the optical lens, in addition to the pursuit of thin lens, the imaging quality and performance of the lens should be also taken into account. in order to meet the demand for imaging on relatively distant objects or close objects, the conventional optical lens is usually implemented with voice coil motor (VCM), then the VCM can be used to adjust the location of the image plane so as to achieve the capability for auto focusing.

However, the design of optical lens is not simply scaling down the lens with good imaging quality so to produce the optical lens having both imaging quality and miniaturization. The designing procedure not only involves the material properties, but also considers the practical issues of production in fabrication, assembly yield and so on. The manner to achieve auto focusing by using the VCM to adjust the location of the image plane would cause the increase of lens length during the operation of VCM. Therefore, it has long been the sophistication goal for industry, government, and academia about how to fabricate the optical lens satisfying the requirements for the consumer electronic products and continuously improve the imaging quality.

SUMMARY OF THE INVENTION

The invention provides an optical lens, which can have good imaging quality for taking photo to the distant or close objects under the condition in reducing the length of lens system.

The invention in an embodiment provides an optical imaging lens including a plurality of lens elements arranged in order from an object side to an mage side along an optical axis. The lens elements include a first lens element, a second lens element, a third lens element, and a fourth lens element, arranged in order from the object side to the image side along the optical axis. Each of the first to fourth lens elements respectively has an object-side surface facing the object side and allowing image rays to pass through, and an image-side surface facing the image side and allowing the image rays to pass through. The first lens element has a positive refracting power and the object-side surface of the first lens element has a convex portion in a vicinity of the optical axis. The second lens element has a refracting power. At least one of the object-side surface and the image-side surface of the third lens element is an aspheric surface. The object-side surface and the image-side surface of the fourth lens element are both aspheric surfaces. The optical imaging lens has only a variable gap. The optical imaging lens satisfies $0.7 \leq EFL/(fG \times F/\#)$, wherein EFL is an effective focal length of the optical imaging lens, fG is a focal length of a lens group formed from all of the lens elements at an object side of the variable gap, and F/# is a f-number of the optical imaging lens.

The invention in an embodiment provides an optical imaging lens including a plurality of lens elements arranged in order from an object side to an image side along an optical axis. The lens elements include a first lens element, a second lens element, a third lens element, and a fourth lens element, arranged in order from the object side to the image side along the optical axis. Each of the first to fourth lens elements has an object-side surface facing the object side and allowing image rays to pass through, and an image-side surface facing the image side and allowing the image rays to pass through. The first lens element has a positive refracting power and the object-side surface of the first lens element has a convex portion in a vicinity of the optical axis. The second lens element has a refracting power. At least one of the object-side surface and the image-side surface of the third lens element is an aspheric surface. The object-side surface and the image-side surface of the fourth lens element are both aspheric surfaces. The optical imaging lens has only a variable gap. The optical imaging lens satisfies $0.5 \leq EFL/(fG \times F/\#)$ and $(TTL \times F/\#)/EFL \leq 2.4$, wherein EFL is an effective focal length of the optical imaging lens, fG is a focal length of a lens group formed from all of the lens elements at an object side of the variable gap, F/# is a f-number of the optical imaging lens, and TTL is distance on the optical axis between the object-side surface of the first lens element and the image plane of the optical image lens.

As to the foregoing descriptions, the advantage effects for the optical imaging lens of the embodiments in the invention cause the optical imaging lens to achieve reduction of shifting distance for the lens elements in auto focusing by design of refracting power of the lens elements and design of concave and convex surfaces of the lens elements, and changing the length of the gap between the lens elements, and satisfying the foregoing conditions. So, the lens length of the optical imaging lens can be effectively reduced to assure the imaging quality and the imaging clarity for taking photo at long distance or short distance can also be improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a drawing, schematically illustrating a surface structure of a lens element.

FIG. 2 is a drawing, schematically illustrating concave and convex surface structure of a lens element and the focal point of ray.

FIG. 3 is a drawing, schematically illustrating a surface structure of lens element, according to a first example.

FIG. 4 is a drawing, schematically illustrating a surface structure of lens element, according to a second example.

FIG. 5 is a drawing, schematically illustrating a surface structure of lens element, according to a third example.

FIG. 8 is a drawing, schematically illustrating the optical data in detail for the optical imaging lens, according to the first embodiment of the invention.

FIG. 9A is a drawing, schematically illustrating the parameters of aspheric surface for the optical imaging lens, according to the first embodiment of the invention.

FIG. 9B is a drawing, schematically illustrating the related parameters of focusing for the optical imaging lens, according to the first embodiment of the invention.

FIG. 12 is a drawing, schematically illustrating the optical data in detail for the optical imaging lens, according to the second embodiment of the invention.

FIG. 13A is a drawing, schematically illustrating the parameters of aspheric surface for the optical imaging lens, according to the second embodiment of the invention.

FIG. 13B is a drawing, schematically illustrating the related parameters of focusing for the optical imaging lens, according to the second embodiment of the invention.

FIG. 16 is a drawing, schematically illustrating the optical data in detail for the optical imaging lens, according to the third embodiment of the invention.

FIG. 17A is a drawing, schematically illustrating the parameters of aspheric surface for the optical imaging lens, according to the third embodiment of the invention.

FIG. 17B is a drawing, schematically illustrating the related parameters of focusing for the optical imaging lens, according to the third embodiment of the invention.

FIG. 20 is a drawing, schematically illustrating the optical data in detail for the optical imaging lens, according to the fourth embodiment of the invention.

FIG. 21A is a drawing, schematically illustrating the parameters of aspheric surface for the optical imaging lens, according to the fourth embodiment of the invention.

FIG. 21B is a drawing, schematically illustrating the related parameters of focusing for the optical imaging lens, according to the fourth embodiment of the invention.

FIG. 24 is a drawing, schematically illustrating the optical data in detail for the optical imaging lens, according to the fifth embodiment of the invention.

FIG. 25A is a drawing, schematically illustrating the parameters of aspheric surface for the optical imaging lens, according to the fifth embodiment of the invention.

FIG. 25B is a drawing, schematically illustrating the related parameters of focusing for the optical imaging lens, according to the fifth embodiment of the invention.

FIG. 28 is a drawing, schematically illustrating the optical data in detail for the optical imaging lens, according to the sixth embodiment of the invention.

FIG. 29A is a drawing, schematically illustrating the parameters of aspheric surface for the optical imaging lens, according to the sixth embodiment of the invention.

FIG. 29B is a drawing, schematically illustrating the related parameters of focusing for the optical imaging lens, according to the sixth embodiment of the invention.

FIG. 32 is a drawing, schematically illustrating the optical data in detail for the optical imaging lens, according to the seventh embodiment of the invention.

FIG. 33A is a drawing, schematically illustrating the parameters of aspheric surface for the optical imaging lens, according to the seventh embodiment of the invention.

FIG. 33B is a drawing, schematically illustrating the related parameters of focusing for the optical imaging lens, according to the seventh embodiment of the invention.

FIG. 36 is a drawing, schematically illustrating the optical data in detail for the optical imaging lens, according to the eighth embodiment of the invention.

FIG. 37A is a drawing, schematically illustrating the parameters of aspheric surface for the optical imaging lens, according to the eighth embodiment of the invention.

FIG. 37B is a drawing, schematically illustrating the related parameters of focusing for the optical imaging lens, according to the eighth embodiment of the invention.

FIG. 40 is a drawing, schematically illustrating the optical data in detail for the optical imaging lens, according to the ninth embodiment of the invention.

FIG. 41A is a drawing, schematically illustrating the parameters of aspheric surface for the optical imaging lens, according to the ninth embodiment of the invention.

FIG. 41B is a drawing, schematically illustrating the related parameters of focusing for the optical imaging lens, according to the ninth embodiment of the invention.

FIG. 44 is a drawing, schematically illustrating the optical data in detail for the optical imaging lens, according to the tenth embodiment of the invention.

FIG. 45A is a drawing, schematically illustrating the parameters of aspheric surface for the optical imaging lens, according to the tenth embodiment of the invention.

FIG. 45B is a drawing, schematically illustrating the related parameters of focusing for the optical imaging lens, according to the tenth embodiment of the invention.

FIG. 46 is a drawing, schematically illustrating the essential parameters and the values in the relation formula for the optical imaging lenses for the first to fifth embodiments.

FIG. 47 is a drawing, schematically illustrating the essential parameters and the values in the relation formula for the optical imaging lenses for the sixth to tenth embodiments.

DESCRIPTION OF THE EMBODIMENTS

Figure 6:
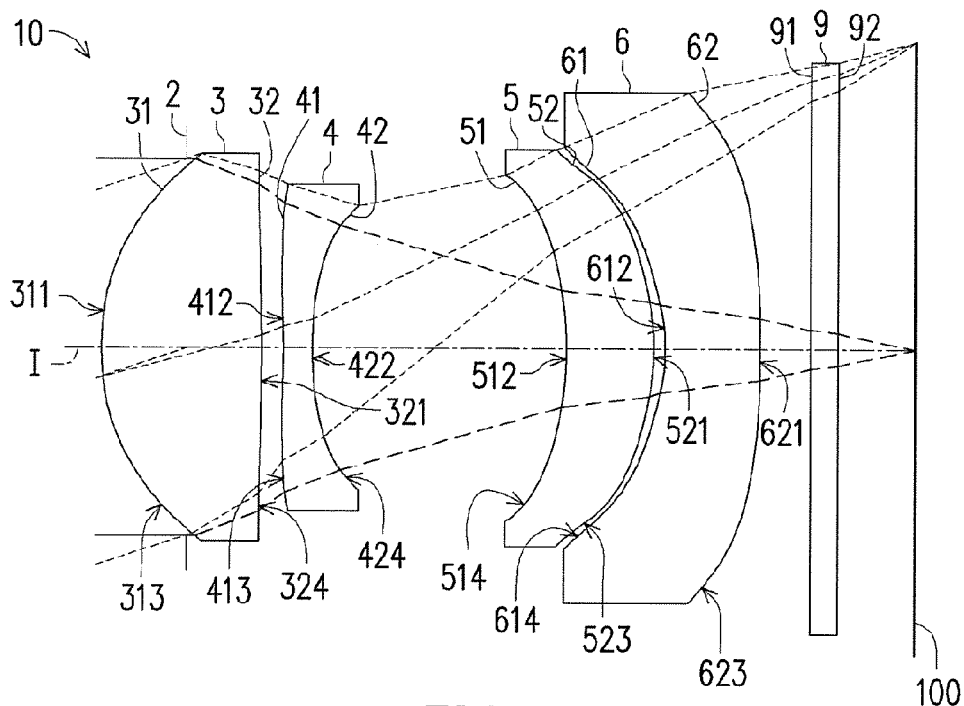
FIG. 6 is a drawing, schematically illustrating an optical imaging lens, according to a first embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. in some embodiments, there are other portions existing between the portion in a vicinity of the optical axis and the portion in a vicinity of a periphery of the lens element; the numbers of portions depend on the numbers of the transition point(s). in addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. in which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. in this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

FIG. 6 is a drawing, schematically illustrating an optical imaging lens, according to an embodiment of the invention. FIG. 7A to FIG. 7D are drawings, schematically illustrating the longitudinal spherical aberration and various kinds of aberration of optical imaging lens, according to an embodiment of the invention. Referring to FIG. 6 first, the optical imaging lens 10 as a first embodiment of the invention has a plurality of lens elements from the object side to the image side in order along an optical axis I of the optical imaging lens 10. In the embodiment, the lens elements includes a first lens element 3, a second lens element 4, a third lens element 5, and a fourth lens element 6, arranged in order from the object side to the image side along the optical axis I. In the embodiment, the optical imaging lens 10 includes an aperture 2, a first lens element 3, a second lens element 4, a third lens element 5, a fourth lens element 6, and a filter 9 in order from the object side to the image side along the optical axis I. When the rays emitted form an object to be taken for photo enter the optical imaging lens 10 and has passed the aperture 2, the first lens element 3, the second lens element 4, the third lens element 5, the fourth lens element 6, and the filter 9, an image is formed at the image plane 100. The filter 9 is, for example, an infra-red (IR) cut filter, used to prevent the IR ray in the rays from transmitting to the image plane 100, affecting the imaging quality. In further remarks, the object side is a side toward the object to be taken for photo and the image side is a side toward the image plane 100.

Each of the first lens element 3, the second lens element 4, the third lens element 5, the fourth lens element 6, and the filter 9 respectively has an object-side surface 31, 41, 51, 61, 91, toward the object side and allowing the image rays to pass through, and an image-side surface 32, 42, 52, 62, 92, toward the image side and allowing the image rays to pass through.

In addition, to meet the demand for lightweight product, all of the first lens element 3 through the fourth lens element 6 have refracting power and are made of plastic material, but this material is not the limitation for the material of the first lens element 3 through the fourth lens element 6.

The first lens element 3 has positive refracting power. The object-side surface 31 of the first lens element 3 is a convex surface and has a convex portion 311 in the vicinity of the optical axis I and a convex portion 313 in a vicinity of a periphery of the first lens element 3. The image-side surface 32 of the first lens element 3 has a convex portion 321 in the vicinity of the optical axis I and a concave portion 324 in a vicinity of a periphery of the first lens element 3. In the embodiment, the object-side surface 31 and the image-side surface 32 of the first lens element 3 are all aspheric surfaces.

The second lens element 4 has a refracting power, such as a negative refracting power. The object-side surface 41 of the second lens element 4 has a concave portion 412 in the vicinity of the optical axis I and a convex portion 413 in a vicinity of a periphery of the second lens element 4. The mage-side surface 42 of the second lens element 4 is a concave surface and has a concave portion 422 in the vicinity of the optical axis I and a concave portion 424 in a vicinity of a periphery of the second lens element 4. In the embodiment, the object-side surface 41 and the image-side surface 42 of the second lens element 4 are all aspheric surfaces.

The third lens element 5 has a positive refracting power. The object-side surface 51 of the third lens element 5 is a concave surface and has a concave portion 512 in the vicinity of the optical axis I and a concave portion 514 in a vicinity of a periphery of the third lens element 5. The image-side surface 52 of the third lens element 5 is a convex surface, and has a convex portion 521 in the vicinity of the optical axis I and a convex portion 523 in a vicinity of a periphery of the third lens element 5. At least one of the object-side surface 51 and the image-side surface 52 of the third lens element 5 is an aspheric surface. In the embodiment, the object-side surface 51 and the image-side surface 52 of the third lens element 5 are all aspheric surfaces.

The fourth lens element 6 has a negative refracting power. The object-side surface 61 of the fourth lens element 6 is a concave surface and has a concave portion 612 in the vicinity of the optical axis I and a concave portion 614 in a vicinity of a periphery of the fourth lens element 6. The image-side surface 62 of the fourth lens element 6 is a convex surface, and has a convex portion 621 in the vicinity of the optical axis I and a convex portion 623 in a vicinity of a periphery of the fourth lens element 6. In the embodiment, the object-side surface 61 and the image-side surface 62 of the fourth lens element 6 are all aspheric surfaces.

The other optical data of the first embodiment in detail is shown in FIG. 8 and an effective focal length (EFL) of the optical imaging lens 10 as a whole in the first embodiment is 7.069 mm and the half field of view (HFOV) is 18.531°, the f-number (F/#) is 2.490, the system length is 6.602 mm, and the image height is 2.4 mm. The system length is referring to the distance on the optical axis I from the object-side surface 31 of the first lens element 3 to the image plane 100.

Further in the embodiment, the object-side surfaces 31, 41, 51, 61 and the image-side surfaces 32, 42, 52, 62, 92 of the first lens element 3, the second lens element 4, the third lens element 5, and the fourth lens element 6 having eight surfaces in total are all aspheric surfaces. The aspheric surface is defined by the formula (1) as follows:

$$Z(Y) = \frac{Y^2}{R} \bigg/ \left(1 + \sqrt{1-(1+K)\frac{Y^2}{R^2}}\right) + \sum_{i=1}^{n} a_i \times Y^i, \quad (1)$$

where
- Y: a distance between a point on the aspheric surface and the optical axis I;
- Z: a depth of the aspheric surface (a perpendicular distance from the point having the distance Y from the optical axis I to a tangential plane being tangent at a top point of the aspheric surface at the optical axis I);
- R: radius of curvature for the surface of the lens element near the optical axis I;
- K: conic constant; and
- $a_i$: the $i^{th}$ order aspheric coefficient.

Every aspheric coefficient for the object-side surface 31 of the first lens element 3 through the image-side surface 62 of the fourth lens element 6 in the formula (1) are shown in FIG. 9A. The field number 31 in FIG. 9A represents the aspheric coefficient of the object-side surface 31 of the first lens element 3, and likewise to the other fields.

In addition, a relation between the essential parameters for the optical imaging lenses 10 from the first to the tenth embodiments as shown in FIG. 46 and FIG. 47, where
- EFL is the effective focal length of the optical imaging lens 10;
- HFOV is half field of view of the optical imaging lens 10;
- FI# is f-number of the optical imaging lens 10;
- T1 is a thickness of the first lens element 3 on the optical axis I;
- T2 is a thickness of the second lens element 4 on the optical axis I;
- T3 is a thickness of the third lens element 5 on the optical axis I;
- T4 is a thickness of the fourth lens element 6 on the optical axis I;
- Ta is a thickness of a first additional lens element 7 on the optical axis I, if the optical imaging lens 10 has five lens elements, then the first additional lens element 7 is located between the first lens element 3 and the second lens element 4;
- Tb is a thickness of a second additional lens element 8 on the optical axis I, if the optical imaging lens 10 has six lens elements, then the first additional lens element 7 is located between the first lens element 3 and the second additional lens element 8, and the second additional lens element 8 is located between the first additional lens element 7 and the second lens element 4;
- G1a is a distance on the optical axis I from the image-side surface 32 of the first lens element 3 to the object-side surface 71 of the first additional lens element 7, when the optical imaging lens 10 is in the situation having five or six lens elements;
- Remarkably, in the following, the distance on the optical axis I between two lens elements is referring to the distance on the optical axis I from the image-side surface of one of the two lens elements closer to the object side to the object-side surface of one of the two lens elements closer to the image side, so that the G1a can be simply defined based on the above principle as the distance on the optical axis I from the first lens element 3 to the first additional lens element 7, or defined as the distance on the optical axis I between the first lens element 3 and the first additional lens element 7, the following parameters are defined by the like manner:
- Ga2 is a distance on the optical axis I from the first additional lens element 7 to the second lens element 4 when the optical imaging lens 10 has five lens elements;
- Gab is a distance on the optical axis I from the first additional lens element 7 to the second additional lens element 8 when the optical imaging lens 10 has six lens elements;
- Gb2 is a distance on the optical axis I from the second additional lens element 8 to the second lens element 4 when the optical imaging lens 10 has six lens elements;
- G12 is a distance on the optical axis I from the first lens element 3 to the second lens element 4; when the optical imaging lens 10 has five lens elements, the parameter G12 is a summation of G1a, Ta and Ga2; the parameter G12 is a summation of G1a, Ta, Gab, Tb and Gb2 when the optical imaging lens 10 has six lens elements;
- G23 is a distance on the optical axis I from the second lens element 4 to the third lens element 5;
- G34 is a distance on the optical axis I from the third lens element 5 to the fourth lens element 6;
- G4F is an air gap on the optical axis I from the fourth lens element 6 to the filter 9;
- TF is a thickness of the filter 9 on the optical axis I;
- GFP is a distance on the optical axis I from the image-side surface 92 of the filter 9 to the image plane 100;
- TTL is a distance on the optical axis I from the objet-side surface 31 of the first lens element 3 to the image plane 100;

BFL is a distance on the optical axis I from the image-side surface 62 of the fourth lens element 6 to the image plane 100;

AAG is a summation of a distance on the optical axis I from the first lens element 3 to the second lens element 4, a distance on the optical axis I from the second lens element 4 to the third lens element 5, and a distance on the optical axis I from the third lens element 5 to the fourth lens element 6, that is, a summation of G12, G23, and G34;

ALT is a summation of thicknesses on the optical axis I of the first lens element 3, the second lens element 4, the third lens element 5, and the fourth lens element 6, that is, a summation of T1, T2, T3, and T4;

TL is a distance on the optical axis I from the object-side surface 31 of the first lens element 3 to the image-side surface 62 of the fourth lens element 6.

Further definitions are following:

f1 is a focal length of the first lens element 3;
f2 is a focal length of the second lens element 4;
f3 is a focal length of the third lens element 5;
f4 is a focal length of the fourth lens element 6;
fa is a focal length of the first additional lens element 7;
fb is a focal length of the second additional lens element 8;
fG is a focal length of all of lens elements as a lens group at the object side of a variable gap in the optical imaging lens 10;
n1 is a refractive index of the first lens element 3;
n2 is a refractive index of the second lens element 4;
n3 is a refractive index of the third lens element 5;
n4 is a refractive index of the fourth lens element 6;
na is a refractive index of the first additional lens element 7;
nb is a refractive index of the second additional lens element 8;
$\nu$1 is an Abbe number of the first lens element 3, and the "Abbe number" is also called "dispersion coefficient";
$\nu$2 is an Abbe number of the second lens element 4;
$\nu$3 is an Abbe number of the third lens element 5;
$\nu$4 is an Abbe number of the fourth lens element 6;
$\nu$a is an Abbe number of the first additional lens element 7; and
$\nu$b is an Abbe number of the second additional lens element 8.

In the embodiments, only one of the several gaps in the optical imaging lens 10 (e.g. a gap between adjacent two lens elements or gap between the lens element and the filter) is a variable gap. When the variable gap is changed, it can cause the optical imaging lens 10 to focus onto the objects at different object distances. in FIG. 9B, when the variable gap is G12, G23, G34 or G4F, it lists the fG value, the EFL/(fG×F/#) value, and the shifting distance for focusing of the optical imaging lens 10, wherein the shifting distance for focusing is referring to an absolute value of a difference between a first value and a second value of a distance on the optical axis I of the variable gap when the optical imaging lens 10 is respectively focusing onto infinity (e.g. 1×10$^{10}$ mm) and 100 mm. Since the difference between the first value obtained at the object length of 1×10$^{10}$ mm and the first value obtained at the object length of infinity is extremely small, the object length of 1×10$^{10}$ mm can be treated as the object length of infinity. For example, as shown in FIG. 9B, when the variable gap is G12 and the other gaps are not changed, that is, G23, G34 and G4F are kept without changing, the fG value of the optical imaging lens 10 is 2.896 mm, the EFL/(fG×F/#) value is 0.980, the shifting distance for focusing is 0.0644 mm. The physical meanings for other parameters listed in the table are similar to above. Remarkably, the unit for the distance or thicknesses is mm in FIG. 9B, FIG. 13B, FIG. 17B, FIG. 21B, FIG. 25B, FIG. 29B, FIG. 33B, FIG. 37B, FIG. 41B, FIG. 45B, FIG. 46, and FIG. 47. For example, the unit of the fG value and the shifting distance for focusing is mm.

In the embodiments, the optical aging lens 10 meets the condition of 0.7≤EFL/(fG×F/#), or the optical imaging lens 10 meets the condition of 0.5 EFL/(fG×F/#) 及 (TL×F/#)/EFL≤2.4. Referring to FIG. 9B, as seen in FIG. 9B, when the variable gap is G12, that is, the variable gap is the distance on the optical axis I between the first lens element 3 and the second lens element 4, the shifting distance for focusing is the shortest, so the designer can choose G12 as the variable gap of the optical imaging lens 10 for focusing. As a result, it can have the shortest moving range of an actuator, such as VCM, used to adjust the variable gap and then the VCM with smaller volume can be adapted to reduce the system length of the optical imaging lens 10. However, the designer can also take the other gap, such as G23, G34 or G4F, as the variable gap, in accordance with the actual need.

Figures 7A, 7B, 7C, 7D:
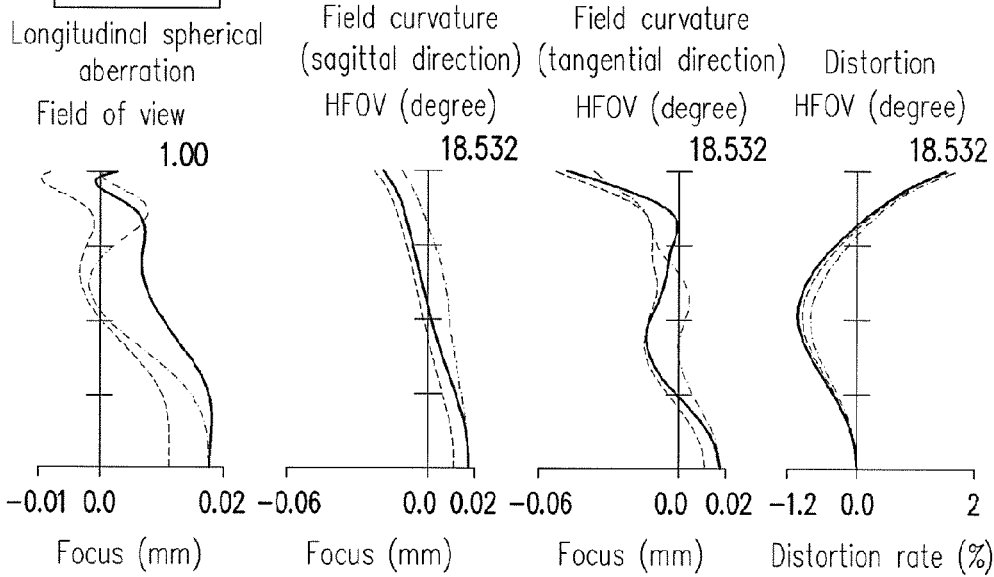
FIG. 7A to FIG. 7D are drawings, schematically illustrating the longitudinal spherical aberration and various kinds of aberration of optical imaging lens, according to the first embodiment of the invention.

Also referring to FIG. 7A to FIG. 7D, the drawing of FIG. 7A describes the longitudinal spherical aberration in the first embodiment. The drawings of FIG. 7B and FIG. 7C are respectively describing the field curvature aberration at the sagittal direction and the field curvature aberration at the tangential direction at the image plane 100 of the first embodiment. The drawing of FIG. 7D describes the distortion aberration at the image plane 100 of the first embodiment. In the first embodiment, the longitudinal spherical aberration shown in FIG. 7A is a simulation result when the pupil radius is set by 1.4729 mm. Further, in the longitudinal spherical aberration shown by FIG. 7A of the first embodiment, the curves formed by each wavelength are close and approaching to the middle. The off-axial ray at different height for every wavelength is concentrated to a nearby of the imaging point. As seen from the defection amplitude of curve for each wavelength, the deflection from the imaging point for the off-axial ray at different height is controlled within a range of ±0.018 mm, so that the embodiment can significantly improve the spherical aberration for the same wavelength. in addition, distance between the representative wavelengths for red, green and blue are rather close. This means that the imaging position for the different wavelengths can be rather concentrated, so the chromatic aberration can also be significantly improved.

For the field curvature aberration shown in FIG. 7B and FIG. 7C, the varying range of focal length for three representative wavelengths in the whole field of view is within ±0.06 mm. This result indicates that the optical system in the first embodiment can effectively reduce the aberration. Further, the distortion aberration in FIG. 7D has shown that the distortion aberration in the first embodiment can be kept within a range of ±1.8%, this also indicates that the distortion aberration in the first embodiment has satisfied the requirement of imaging quality in optical system. As a result, in comparing with the conventional optical lens, the first embodiment can still provide a better imaging quality even at the condition that the system length has been reduced down to about 6.602 mm. In this manner, the first embodiment can reduce the lens length while the optical property can still be maintained at a good condition, so to achieve the thinner product design. In addition, the optical imaging lens 10 of the first embodiment has relative small field of view and has the advantage to achieve telephoto. Furthermore, the optical imaging lens 10 can reduce the amount of change of lens length when auto focusing, so that the optical imaging lens 10 can effectively reduce the lens length and assure the imaging quality, and also improve the image clarity.

Figure 10:
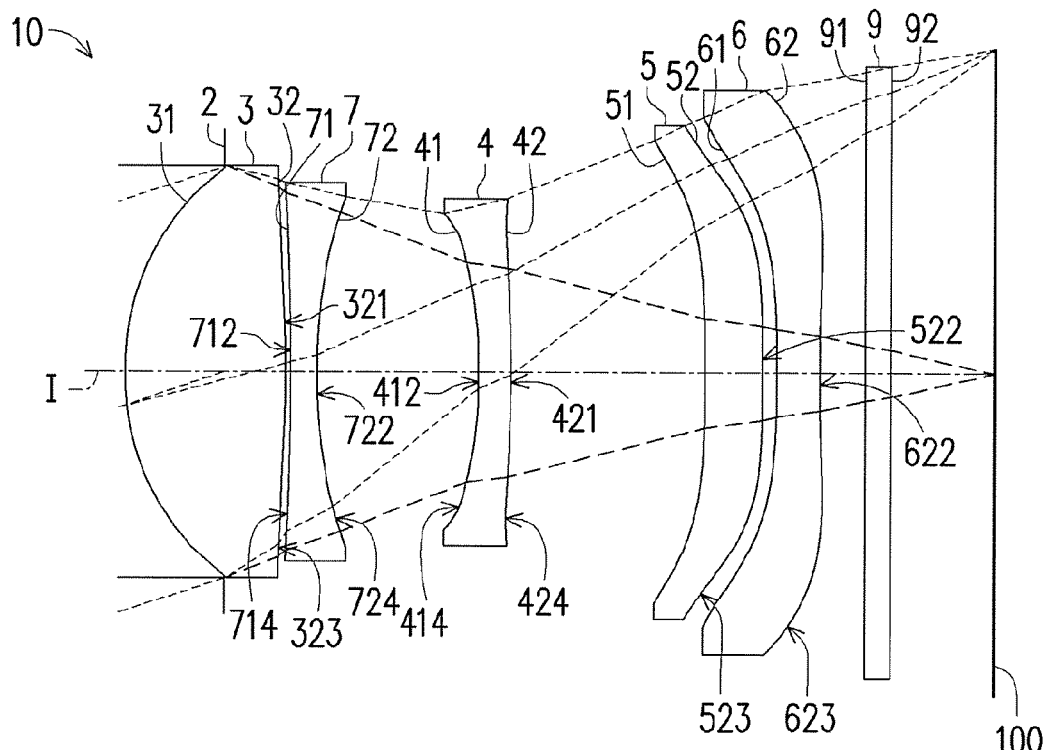
FIG. 10 is a drawing, schematically illustrating an optical imaging lens, according to a second embodiment of the invention.

FIG. 10 is a drawing, schematically illustrating an optical imaging lens, according to a second embodiment of the invention. FIG. 11A to FIG. 11D are drawings, schematically illustrating the longitudinal spherical aberration and various kinds of aberration of optical imaging lens, according to the second embodiment of the invention. Referring to FIG. 10 first, a second embodiment of the optical imaging lens 10 is basically similar to the first embodiment but the optical data, the aspheric coefficients and the parameters between the lens elements 3, 4, 5, 6 may be more or less a little different. The differences between the two embodiments are described as follows. In the second embodiment, the lens elements of the optical imaging lens 10 further include a first additional lens element 7, located between the first lens element 3 and the second lens element 4. The first additional lens element 7 has a negative refracting power. The object-side surface 71 of the first additional lens element 7 is a concave surface and has a concave portion 712 in the vicinity of the optical axis I and a concave portion 714 in a vicinity of a periphery of the first additional lens element 7. The image-side surface 72 of the first additional lens element 7 is a concave surface, and has a concave portion 722 in the vicinity of the optical axis I and a concave portion 724 in a vicinity of a periphery of the first additional lens element 7. In the second embodiment, the image-side surface 32 of the first lens element 3 is a convex surface, and has a convex portion 321 in the vicinity of the optical axis I and a convex portion 323 in a vicinity of a periphery of the first lens element 3. The object-side surface 41 of the second lens element 4 is a concave surface, and has a concave portion 412 in the vicinity of the optical axis I and a concave portion 414 in a vicinity of a periphery of the second lens element 4. The image-side surface 42 of the second lens element 4 has a convex portion 421 in the vicinity of the optical axis I and a concave portion 424 in a vicinity of a periphery of the second lens element 4. The third lens element 5 has a negative refracting power. The image-side surface 52 of the third lens element 5 has a concave portion 522 in the vicinity of the optical axis I and a convex portion 523 in a vicinity of a periphery of the third lens element 5. The image-side surface 62 of the fourth lens element 6 has a concave portion 622 in the vicinity of the optical axis I and a convex portion 623 in a vicinity of a periphery of the fourth lens element 6. Remarkably here, to clearly show the drawing, the reference numerals for the concave portion and the convex portion in FIG. 10, like to the first embodiment, have been omitted.

In addition, to meet the demand for lightweight product, in the embodiment, all of the first lens element 3 through the fourth lens element 6 and the first additional lens element 7 have refracting power and are made of plastic material, but this material is not the limitation for the material of the first lens element 3 through the fourth lens element 6 and the first additional lens element 7.

The detailed optical data of the optical imaging lens 10 are shown in FIG. 12, and the effective focal length of the optical imaging lens 10 in the second embodiment is 8.696 mm, the HFOV is 18.617°, the F/# is 2.307, the system length is 6.381 mm, the image height is 2.944 mm.

As shown in FIG. 13A, it is all of the aspheric coefficients in formula (1) from the object-side surface 31 of the first lens element 3 to the image-side surface 72 of the first additional lens element 7 in the second embodiment.

Further, relations between all of the essential parameters in the optical imaging lens 10 of the second embodiment are shown in FIG. 46.

In the embodiment, only one of several gaps in the optical imaging lens 10 can be a variable gap. When the variable gap is changed, it can cause the optical imaging lens 10 to focus onto the object at different object length. In FIG. 13B, when the variable gap is G1a, Ga3, G23, G34 or G4F, it lists the fG value, the EFL/(fG×F/#) value, and the shifting distance for focusing in the optical imaging lens 10, wherein the shifting distance for focusing is referring to an absolute value of a difference between a first value and a second value of a distance on the optical axis I of the variable gap when the optical imaging lens 10 is respectively focusing onto infinity (e.g. $1\times10^{10}$ mm) and 100 mm.

Referring to FIG. 13B, as seen in FIG. 13B, when the variable gap is G1a, that is, the variable gap is a distance on the optical axis I between the first lens element 3 and the first additional lens element 7, in which the shifting distance for focusing is the shortest, so the designer can choose G1a as the variable gap of the optical imaging lens 10 for focusing. As a result, it can have the shortest moving range of an actuator, such as VCM, used to adjust the variable gap and then the VCM with smaller volume can be adapted to reduce the system length of the optical imaging lens 10.

Figures 11A, 11B, 11C, 11D:
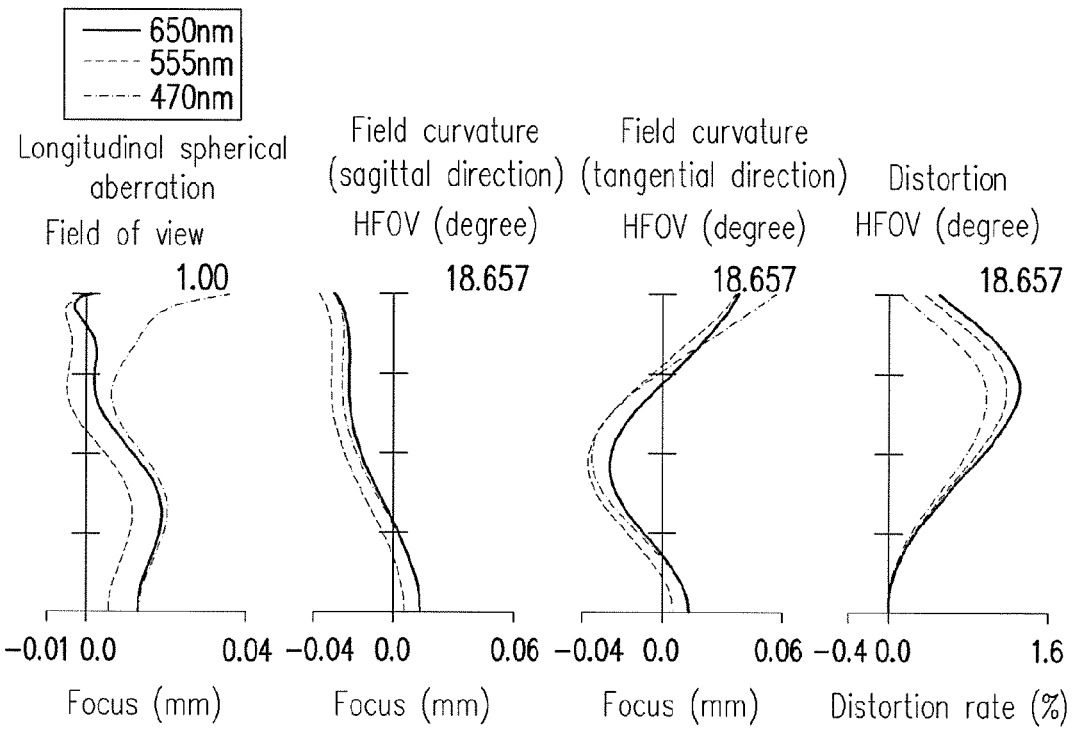
FIG. 11A to FIG. 11D are drawings, schematically illustrating the longitudinal spherical aberration and various kinds of aberration of optical imaging lens, according to the second embodiment of the invention.

The longitudinal spherical aberration of the second embodiment in FIG. 11A is a simulation result when the pupil radius is set by 1.8750 mm. Further, in the longitudinal spherical aberration shown by FIG. 11A of the second embodiment, the deflection from the imaging point for the off-axial ray at different height is controlled within a range of ±0.04 mm. For the two field curvature aberrations shown in FIG. 11B and FIG. 11C, the varying range of focal length for three representative wavelengths in the whole field of view is within ±0.06 mm. Further, the distortion aberration in FIG. 11D has shown that the distortion aberration in the second embodiment can be kept within a range of ±1.4%. As a result, in comparing with the conventional optical lens, the second embodiment can still provide a better imaging quality even at the condition that the system length has been reduced down to about 6.382 mm.

As to the foregoing descriptions, the second embodiment in comparing with the first embodiment has the advantages: the F/# of the second embodiment is less than the F/# of the first embodiment, the lens length (that is system length) of the second embodiment is shorter than the lens length of the first embodiment, the distortion aberration of the second embodiment is smaller than the distortion aberration of the first embodiment, and the second embodiment is easier in fabrication than the first embodiment so the yield is higher.

Figure 14:
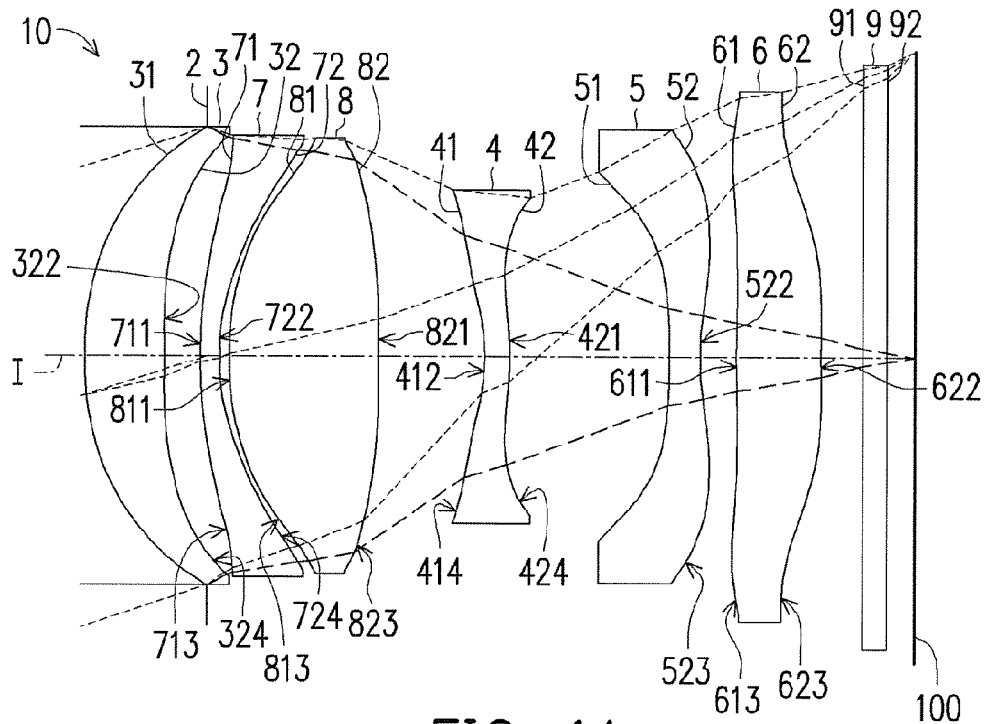
FIG. 14 is a drawing, schematically illustrating an optical imaging lens, according to a third embodiment of the invention.

FIG. 14 is a drawing, schematically illustrating an optical imaging lens, according to a third embodiment of the invention. FIG. 15A to FIG. 15D are drawings, schematically illustrating the longitudinal spherical aberration and various kinds of aberration of optical imaging lens, according to the third embodiment of the invention. Referring to FIG. 14 first, a third embodiment of the optical imaging lens 10 is basically similar to the first embodiment but the optical data, the aspheric coefficients and the parameters between the lens elements 3, 4, 5, 6 may be more or less a little different. The differences between the two embodiments are described as follows. In the third embodiment, the lens elements of the optical imaging lens 10 further include a first additional lens element 7 and a second additional lens element 8. The first additional lens element 7 is located between the first lens element 3 and the second additional lens element 8. The second additional lens element 8 is located between the first additional lens element 7 and the second lens element 4. The first additional lens element 7 has a negative refracting power. The object-side surface 71 of the first additional lens element 7 is a convex surface and has a convex portion 711 in the vicinity of the optical axis I and a convex portion 713 in a vicinity of a periphery of the first additional lens element 7. The image-side surface 72 of the first additional lens element 7 is a concave surface and has a concave portion 722 in the vicinity of the optical axis I and a concave portion 724 in a vicinity of a periphery of the first additional lens element 7. The second additional lens element 8 has a positive refracting power. The object-side surface 81 of the second additional lens element 8 is a convex surface and has a convex portion 811 in the vicinity of the optical axis I and a convex portion 813 in a vicinity of a periphery of the second additional lens element 8. The image-side surface 82 of the second additional lens element 8 is a convex surface and has a convex portion 821 in the vicinity of the optical axis I and a convex portion 823 in a vicinity of a periphery of the second additional lens element 8. Further, in the third embodiment, the image-side surface 32 of the first lens element 3 is a concave surface, and has a concave portion 322 in the vicinity of the optical axis I and a concave portion 324 in a vicinity of a periphery of the first lens element 3. The object-side surface 41 of the second lens element 4 is a concave surface, and has a concave portion 412 in the vicinity of the optical axis I and a concave portion 414 in a vicinity of a periphery of the second lens element 4. The image-side surface 42 of the second lens element 4 has a convex portion 421 in the vicinity of the optical axis I and a concave portion 424 in a vicinity of a periphery of the second lens element 4. The third lens element 5 has a negative refracting power. The image-side surface 52 of the third lens element 5 has a concave portion 522 in the vicinity of the optical axis I and a convex portion 523 in vicinity of a periphery of the third lens element 5. The fourth lens element 6 has a positive refracting power. The object-side surface 61 of the fourth lens element 6 has a convex portion 611 in the vicinity of the optical axis I and a convex portion 613 in a vicinity of a periphery of the fourth lens element 6. The image-side surface 62 of the fourth lens element 6 has a concave portion 622 in the vicinity of the optical axis I and a convex portion 623 in a vicinity of a periphery of the fourth lens element 6. Remarkably here, to clearly show the drawing, the reference numerals for the concave portion and the convex portion in FIG. 14, like to the first embodiment, have been omitted.

In addition, to meet the demand for lightweight product, in the embodiment, all of the first lens element 3 through the fourth lens element 6 and the first additional lens element 7 and the second additional lens element 8 have refracting power and are made of plastic material, but this material is not the limitation for the material of the first lens element 3 through the fourth lens element 6 and the first additional lens element 7 and the second additional lens element 8.

The detailed optical data of the optical imaging lens 10 are shown in FIG. 16, and the effective focal length of the optical imaging lens 10 in the third embodiment is 9.000 mm, the HFOV is 17.846°, the F/# is 1.916, the system length is 7.958 mm, the image height is 2.4 mm.

As shown in FIG. 17A, it is all of the aspheric coefficients in formula (1) from the object-side surface 31 of the first lens element 3 to the image-side surface 82 of the second additional lens element 8 in the third embodiment.

Further, relations between all of the essential parameters in the optical imaging lens 10 of the third embodiment are shown in FIG. 46.

In the embodiment, only one of several gaps in the optical imaging lens 10 can be a variable gap. When the variable gap is changed, it can cause the optical imaging lens 10 to focus onto the object at different object length. in FIG. 17B, when the variable gap is G1a, Gab, Gb2, G23, G34 or G4F, it lists the fG value, the EFL/(fG×F/#) value, and the shifting distance for focusing in the optical imaging lens 10, wherein the shifting distance for focusing is referring to an absolute value of a difference between a first value and a second value of a distance on the optical axis I of the variable gap when the optical imaging lens 10 is respectively focusing onto infinity (e.g. $1 \times 10^{10}$ mm) and 100 mm.

Referring to FIG. 17B, as seen in FIG. 17B, when the variable gap is Gb2, that is, the variable gap is a distance on the optical axis I between the second additional lens element 8 and the second lens element 4, in which the shifting distance for focusing is the shortest, so the designer can choose Gb2 as the variable gap of the optical imaging lens 10 for focusing. As a result, it can have the shortest moving range of an actuator, such as VCM, used to adjust the variable gap and then the VCM with smaller volume can be adapted to reduce the system length of the optical imaging lens 10. in FIG. 17B, the grid indicated by "incapable for focusing" means that the optical imaging lens 10 cannot properly focus onto the object at each object length when the variable gap is Gab.

Figures 15A, 15B, 15C, 15D:
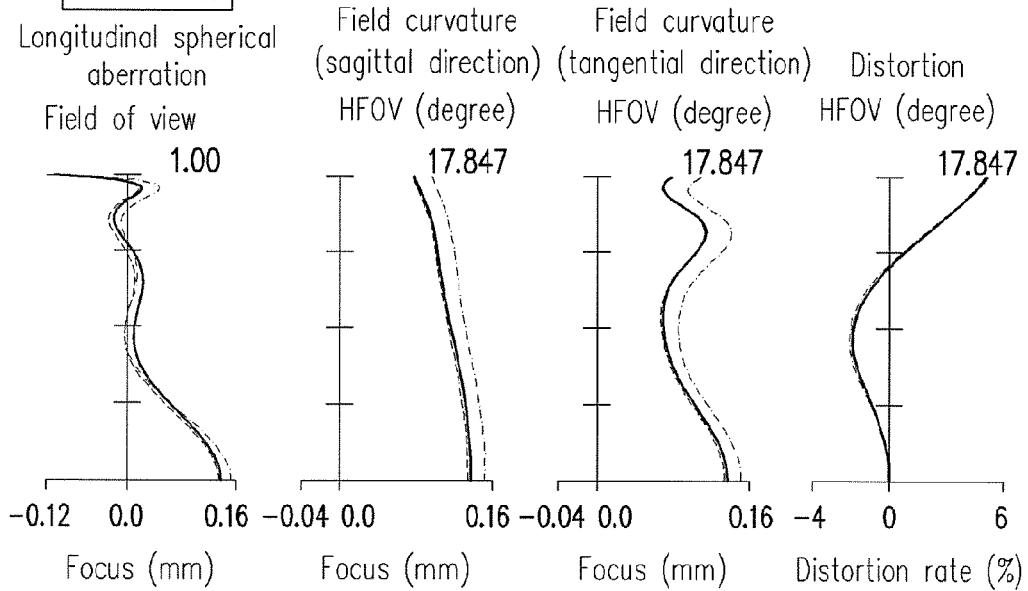
FIG. 15A to FIG. 15D are drawings, schematically illustrating the longitudinal spherical aberration and various kinds of aberration of optical imaging lens, according to the third embodiment of the invention.

The longitudinal spherical aberration of the third embodiment in FIG. 15A is a simulation result when the pupil radius is set by 2.1951 mm. Further, in the longitudinal spherical aberration shown by FIG. 15A of the third embodiment, the deflection from the imaging point for the off-axial ray at different height is controlled within a range of ±0.016 mm. For the two field curvature aberrations shown in FIG. 15B and FIG. 15C, the varying range of focal length for three representative wavelengths in the whole field of view is within ±0.16 mm. Further, the distortion aberration in FIG. 15D has shown that the distortion aberration in the third embodiment can be kept within a range of ±5%. As a result, in comparing with the conventional optical lens, the third embodiment can still provide a better imaging quality even at the condition that the system length has been reduced down to about 7.958 mm.

As to the foregoing descriptions, the third embodiment in comparing with the first embodiment has the advantages: the F/# of the third embodiment is less than the F/# of the first embodiment; the HFOV of the third embodiment is smaller than the HFOV of the first embodiment, so to have a better property of telephoto; the longitudinal spherical aberration of the third embodiment is smaller than the longitudinal spherical aberration of the first embodiment; the third embodiment is easier in fabrication than the first embodiment so the yield is higher.

Figure 18:
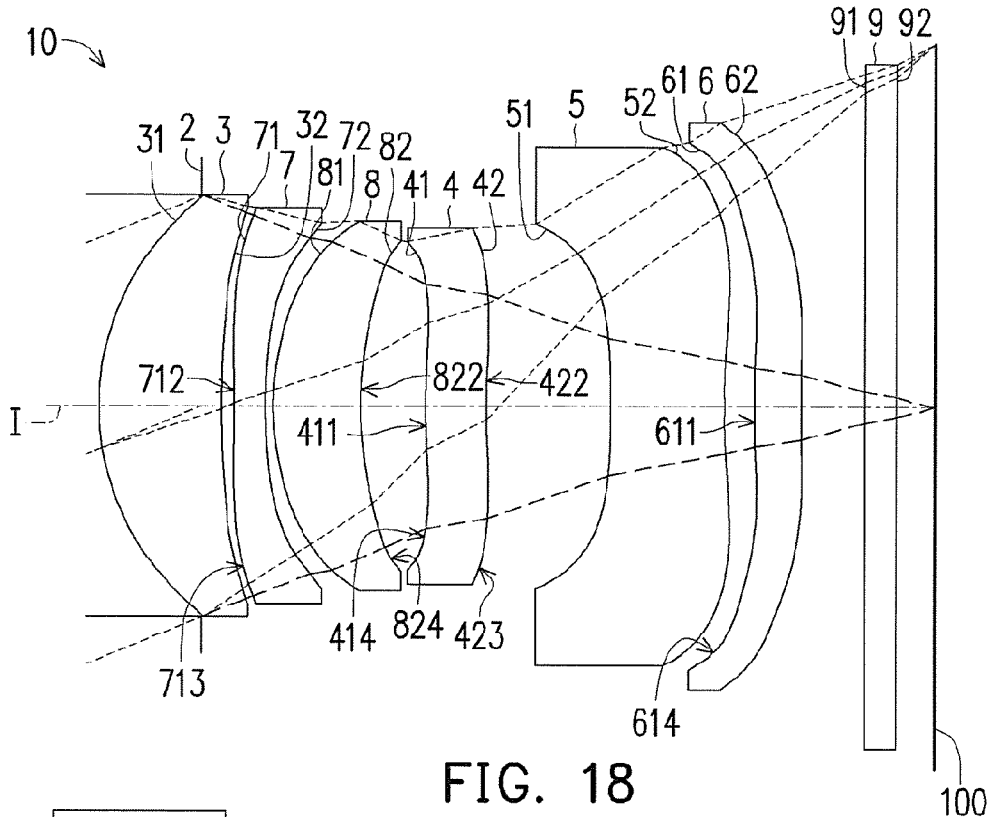
FIG. 18 is a drawing, schematically illustrating an optical imaging lens, according to a fourth embodiment of the invention.

FIG. 18 is a drawing, schematically illustrating an optical imaging lens, according to a fourth embodiment of the invention. FIG. 19A to FIG. 19D are drawings, schematically illustrating the longitudinal spherical aberration and various kinds of aberration of optical imaging lens, according to the fourth embodiment of the invention. Referring to FIG. 18 first, a fourth embodiment of the optical imaging lens 10 is basically similar to the third embodiment but the optical data, the aspheric coefficients and the parameters between the lens elements 3, 4, 5, 6, 7, 8 may be more or less a little different. The differences between the two embodiments are described as follows. In the fourth embodiment, the object-side surface 71 of the first additional lens element 7 has a concave portion 712 in the vicinity of the optical axis I and a convex portion 713 in a vicinity of a periphery of the first additional lens element 7. The image-side surface 82 of the second additional lens element 8 is a concave surface and has a concave portion 822 in the vicinity of the optical axis I and a concave portion 824 in a vicinity of a periphery of the second additional lens element 8. The second lens element 4 has a positive refracting power. The object-side surface 41 of the second lens element 4 has a convex portion 411 in the vicinity of the optical axis I and a concave portion 414 in a vicinity of a periphery of the second lens element 4. The image-side surface 42 of the second lens element 4 has a concave portion 422 in the vicinity of the optical axis I and a convex portion 423 in a vicinity of a periphery of the second lens element 4. The object-side surface 61 of the fourth lens element 6 has a convex portion 611 in the vicinity of the optical axis I and a concave portion 614 in a vicinity of a periphery of the fourth lens element 6. Remarkably here, to clearly show the drawing, the reference numerals for the concave portion and the convex portion in FIG. 18, like to the third embodiment, have been omitted.

The detailed optical data of the optical imaging lens 10 are shown in FIG. 20, and the effective focal length of the optical imaging lens 10 in the fourth embodiment is 5.359 mm, the HFOV is 22.5°, the F/# is 1.978, the system length is 5.325 mm, and the image height is 2.317 mm.

As shown in FIG. 21A, it is all of the aspheric coefficients in formula (1) from the object-side surface 31 of the first lens element 3 to the image-side surface 82 of the second additional lens element 8 in the fourth embodiment.

Further, relations between all of the essential parameters in the optical imaging lens 10 of the fourth embodiment are shown in FIG. 46.

In the embodiment, only one of several gaps in the optical imaging lens 10 can be a variable gap. When the variable gap is changed, it can cause the optical imaging lens 10 to focus onto the object at different object length. In FIG. 21B, when the variable gap is G1a, Gab, Gb2, G23, G34 or G4F, it lists the fG value, the EFL/(fG×F/#) value, and the shifting distance for focusing in the optical imaging lens 10, wherein the shifting distance for focusing is referring to an absolute value of a difference between a first value and a second value of a distance on the optical axis I of the variable gap when the optical imaging lens 10 is respectively focusing onto infinity (e.g. $1 \times 10^{10}$ mm) and 100 mm.

Referring to FIG. 21B, as seen in FIG. 21B, when the variable gap is Gb2, that is, the variable gap is a distance on the optical axis I between the second additional lens element 8 and the second lens element 4, in which the shifting distance for focusing is the shortest, so the designer can choose Gb2 as the variable gap of the optical imaging lens 10 for focusing. As a result, it can have the shortest moving range of an actuator, such as VCM, used to adjust the variable gap and then the VCM with smaller volume can be adapted to reduce the system length of the optical imaging lens 10. In FIG. 21B, the grid indicated by "incapable for focusing" means that the optical imaging lens 10 cannot properly focus onto the object at each object length when the variable gap is Gab.

Figures 19A, 19B, 19C, 19D:
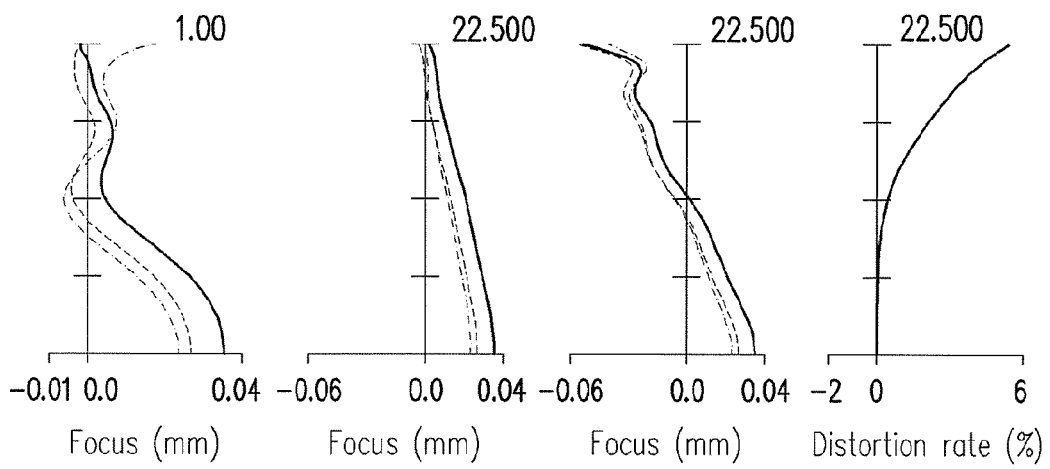
FIG. 19A to FIG. 19D are drawings, schematically illustrating the longitudinal spherical aberration and various kinds of aberration of optical imaging lens, according to the fourth embodiment of the invention.

The longitudinal spherical aberration of the fourth embodiment in FIG. 19A is a simulation result when the pupil radius is set by 1.3400 mm, Further, in the longitudinal spherical aberration shown by FIG. 19A of the fourth embodiment, the deflection from the imaging point for the off-axial ray at different height is controlled within a range of ±0.036 mm. For the two field curvature aberrations shown in FIG. 19B and FIG. 19C, the varying range of focal length for three representative wavelengths in the whole field of view is within ±0.06 mm. Further, the distortion aberration in FIG. 19D has shown that the distortion aberration in the fourth embodiment can be kept within a range of ±6%. As a result, in comparing with the conventional optical lens, the fourth embodiment can still provide a better imaging quality even at the condition that the system length has been reduced down to about 5.325 mm.

As to the foregoing descriptions, the fourth embodiment in comparing with the third embodiment has the advantages: the lens length (that is system length) of the fourth embodiment is less than the lens length of the third embodiment; the field curvature aberration of the fourth embodiment is smaller than the field curvature aberration of the third embodiment, the fourth embodiment is easier in fabrication than the third embodiment so the yield is higher.

Figure 22:
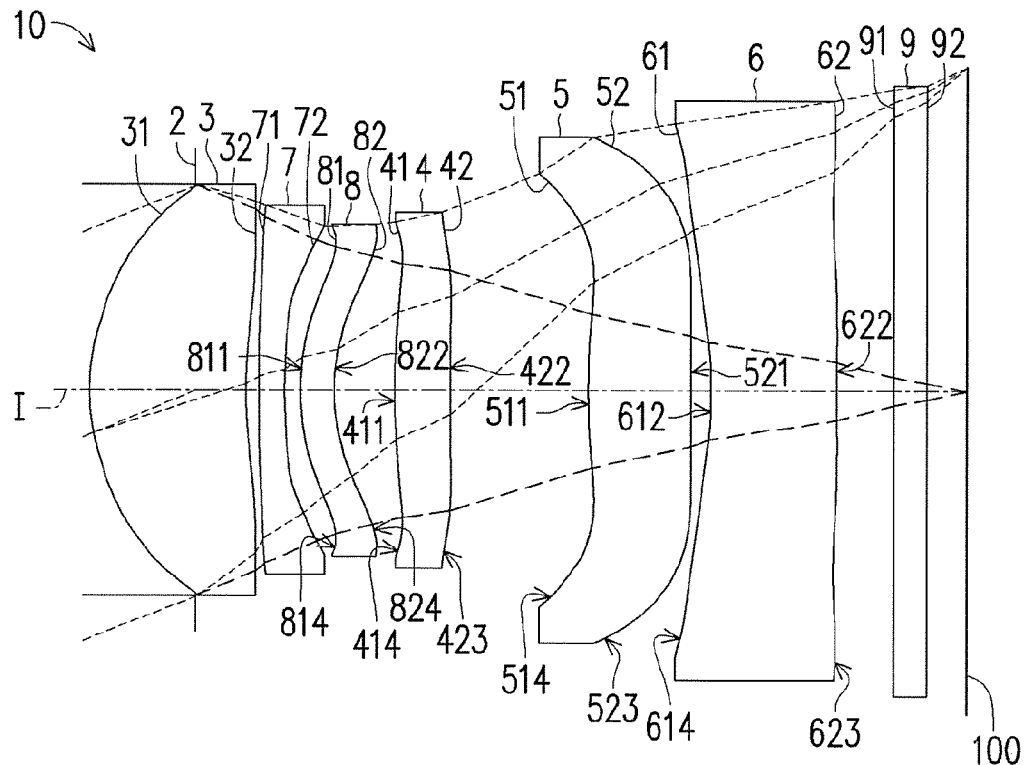
FIG. 22 is a drawing, schematically illustrating an optical imaging lens, according to a fifth embodiment of the invention.

FIG. 22 is a drawing, schematically illustrating an optical imaging lens, according to a fifth embodiment of the invention. FIG. 23A to FIG. 23D are drawings, schematically illustrating the longitudinal spherical aberration and various kinds of aberration of optical imaging lens, according to the fifth embodiment of the invention. Referring to FIG. 22 first, a fifth embodiment of the optical imaging lens 10 is basically similar to the third embodiment but the optical data, the aspheric coefficients and the parameters between the lens elements 3, 4, 5, 6, 7, 8 may be more or less a little different. The differences between the two embodiments are described as follows. In the fifth embodiment, the object-side surface 81 of the second additional lens element 8 has a convex portion 811 in the vicinity of the optical axis I and a concave portion 814 in a vicinity of a periphery of the second additional lens element 8. The image-side surface 82 of the second additional lens element 8 is a concave surface and has a concave portion 822 in the vicinity of the optical axis I and a concave portion 824 in a vicinity of a periphery of the second additional lens element 8. The object-side surface 41 of the second lens element 4 has a convex portion 411 in the vicinity of the optical axis I and a concave portion 414 in a vicinity of a periphery of the second lens element 4. The image-side surface 42 of the second lens element 4 has a concave portion 422 in the vicinity of the optical axis I and a convex portion 423 in a vicinity of a periphery of the second lens element 4. The object-side surface 51 of the third lens element 5 has a convex portion 511 in the vicinity of the optical axis I and a concave portion 514 in a vicinity of a periphery of the third lens element 5. The image-side surface 52 of the third lens element 5 has a convex portion 521 in the vicinity of the optical axis I and a convex portion 523 in a vicinity of a periphery of the third lens element 5. The object-side surface 61 of the fourth lens element 6 is a concave surface and has a concave portion 612 in the vicinity of the optical axis I and a concave portion 614 in a vicinity of a periphery of the fourth lens element 6. Remarkably here, to clearly show the drawing, the reference numerals for the concave portion and the convex portion in FIG. 22, like to the third embodiment, have been omitted.

The detailed optical data of the optical imaging lens 10 are shown in FIG. 24, and the effective focal length of the optical imaging lens 10 in the fifth embodiment is 7.065 mm, the HFOV is 22.5°, the F/# is 1.966, the system length is 5.747 mm, and the image height is 2.120 mm.

As shown in FIG. 25A, it is all of the aspheric coefficients in formula (1) from the object-side surface 31 of the first lens element 3 to the image-side surface 82 of the second additional lens element 8 in the fifth embodiment.

Further, relations between all of the essential parameters in the optical imaging lens 10 of the fifth embodiment are shown in FIG. 46.

In the embodiment, only one of several gaps in the optical imaging lens 10 can be a variable gap. When the variable gap is changed, it can cause the optical imaging lens 10 to focus onto the object at different object length. in FIG. 25B, when the variable gap is G1a, Gab, Gb2, G23, G34 or G4F, it lists the fG value, the EFL/(fG×F/#) value, and the shifting distance for focusing in the optical imaging lens 10, wherein the shifting distance for focusing is referring to an absolute value of a difference between a first value and a second value of a distance on the optical axis I of the variable gap when the optical imaging lens 10 is respectively focusing onto infinity (e.g. 1×10$^{10}$ mm) and 100 mm.

Referring to FIG. 25B, as seen in FIG. 25B, when the variable gap is G1a, that is, the variable gap is a distance on the optical axis I between the first lens element 3 and the first additional lens element 7, in which the shifting distance for focusing is the shortest, so the designer can choose G1a as the variable gap of the optical imaging lens 10 for focusing. As a result, it can have the shortest moving range of an actuator, such as VCM, used to adjust the variable gap and then the VCM with smaller volume can be adapted to reduce the system length of the optical imaging lens 10. In FIG. 25B, the three grids indicated by "incapable for focusing" mean that the optical imaging lens 10 cannot properly focus onto the object at each object length when the variable gap is Gab, Gb2, or G23.

Figures 23A, 23B, 23C, 23D:
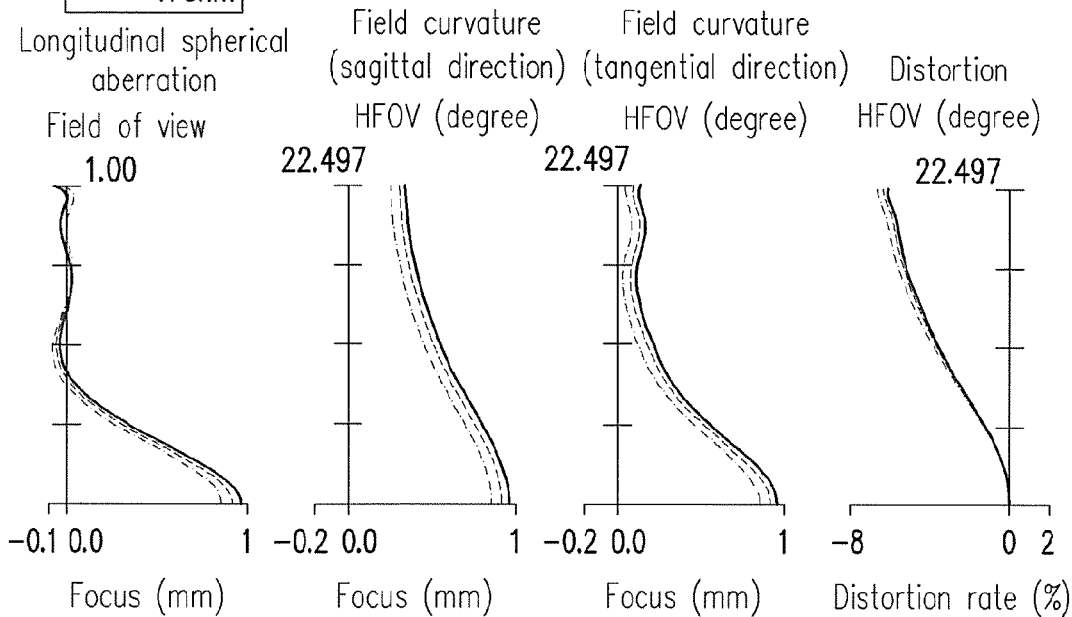
FIG. 23A to FIG. 23D are drawings, schematically illustrating the longitudinal spherical aberration and various kinds of aberration of optical imaging lens, according to the fifth embodiment of the invention.

The longitudinal spherical aberration of the fifth embodiment in FIG. 23A is a simulation result when the pupil radius is set by 1.3400 mm. Further, in the longitudinal spherical aberration shown by FIG. 23A of the fifth embodiment, the deflection from the imaging point for the off-axial ray at different height is controlled within a range of ±1 mm. For the two field curvature aberrations shown in FIG. 23B and FIG. 23C, the varying range of focal length for three representative wavelengths in the whole field of view is within ±1.00 mm. Further, the distortion aberration in FIG. 23D has shown that the distortion aberration in the fifth embodiment can be kept within a range of ±7%. As a result, in comparing with the conventional optical lens, the fifth embodiment can still provide a better imaging quality even at the condition that the system length has been reduced down to about 5.747 mm.

As to the foregoing descriptions, the fifth embodiment in comparing with the third embodiment has the advantages: the lens length (that is system length) of the fifth embodiment is less than the lens length of the third embodiment; the fifth embodiment is easier in fabrication than the third embodiment so the yield is higher.

Figure 26:
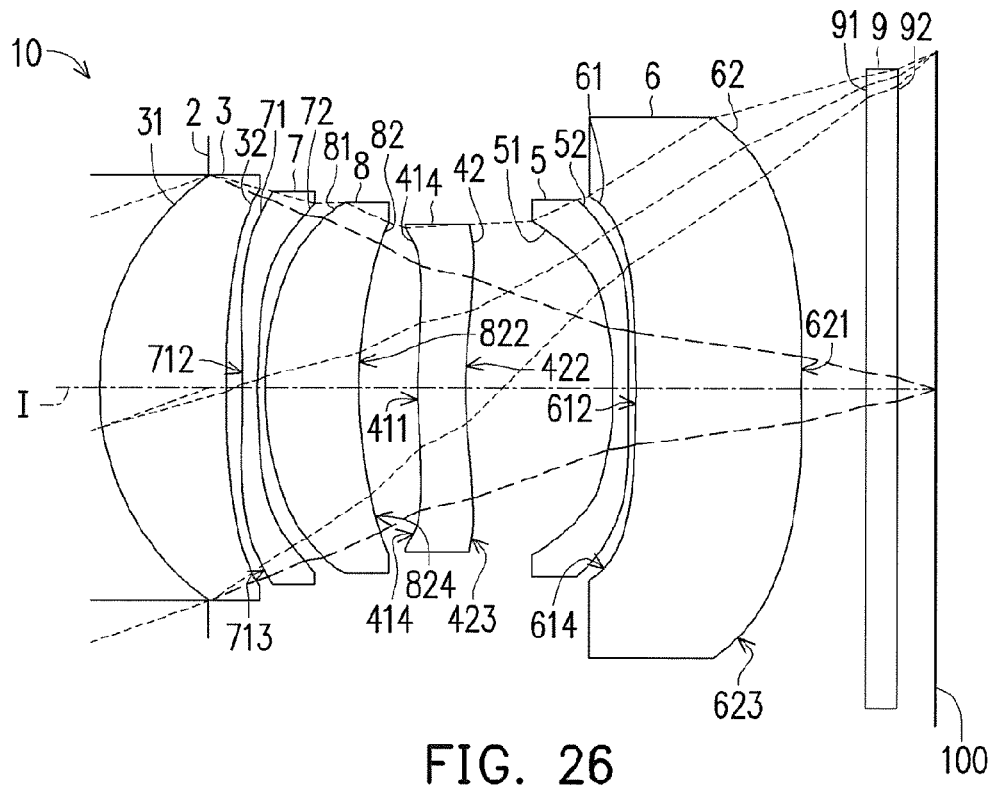
FIG. 26 is a drawing, schematically illustrating an optical imaging lens, according to a sixth embodiment of the invention.

FIG. 26 is a drawing, schematically illustrating an optical imaging lens, according to a sixth embodiment of the invention. FIG. 27A to FIG. 27D are drawings, schematically illustrating the longitudinal spherical aberration and various kinds of aberration of optical imaging lens, according to the sixth embodiment of the invention. Referring to FIG. 26 first, a sixth embodiment of the optical imaging lens 10 is basically similar to the third embodiment but the optical data, the aspheric coefficients and the parameters between the lens elements 3, 4, 5, 6, 7, 8 may be more or less a little different. The differences between the two embodiments are described as follows. In the sixth embodiment, the object-side surface 71 of the first additional lens element 7 has a concave portion 712 in the vicinity of the optical axis I and a convex portion 713 in a vicinity of a periphery of the first additional lens element 7. The image-side surface 82 of the second additional lens element 8 is a concave surface and has a concave portion 822 in the vicinity of the optical axis I and a concave portion 824 in a vicinity of a periphery of the second additional lens element 8. The object-side surface 41 of the second lens element 4 has a convex portion 411 in the vicinity of the optical axis I and a concave portion 414 in a vicinity of a periphery of the second lens element 4. The image-side surface 42 of the second lens element 4 has a concave portion 422 in the vicinity of the optical axis I and a convex portion 423 in a vicinity of a periphery of the second lens element 4. The object-side surface 61 of the fourth lens element 6 is a concave surface and has a concave portion 612 in the vicinity of the optical axis I and a concave portion 614 in a vicinity of a periphery of the fourth lens element 6. The image-side surface 62 of the fourth lens element 6 is a convex surface and has a convex portion 621 in the vicinity of the optical axis I and a convex portion 623 in a vicinity of a periphery of the fourth lens element 6. Remarkably here, to clearly show the drawing, the reference numerals for the concave portion and the convex portion in FIG. 26, like to the third embodiment, have been omitted.

The detailed optical data of the optical imaging lens 10 are shown in FIG. 28, and the effective focal length of the optical imaging lens 10 in the sixth embodiment is 8.732 mm, the HFOV is 20°, the F/# is 2.096, the system length is 5.256 mm, and the image height is 2.116 mm.

As shown in FIG. 29A, it is all of the aspheric coefficients in formula (1) from the object-side surface 31 of the first lens element 3 to the image-side surface 82 of the second additional lens element 8 in the sixth embodiment.

Further, relations between all of the essential parameters in the optical imaging lens 10 of the sixth embodiment are shown in FIG. 47.

In the embodiment, only one of several gaps in the optical imaging lens 10 can be a variable gap. When the variable gap is changed, it can cause the optical imaging lens 10 to focus onto the object at different object length. In FIG. 29B, when the variable gap is G1a, Gab, Gb2, G23, G34 or G4F, it lists the fG value, the EFL/(fG F/#) value, and the shifting distance for focusing in the optical imaging lens 10, wherein the shifting distance for focusing is referring to an absolute value of a difference between a first value and a second value of a distance on the optical axis I of the variable gap when the optical imaging lens 10 is respectively focusing onto infinity (e.g. 1×10$^{10}$ mm) and 100 mm.

Referring to FIG. 29B, as seen in FIG. 29B, when the variable gap is Gb2, that is, the variable gap is a distance on the optical axis I between the second additional lens element 8 and the second lens element 4, in which the shifting distance for focusing is the shortest, so the designer can choose Gb2 as the variable gap of the optical imaging lens 10 for focusing. As a result, it can have the shortest moving range of an actuator, such as VCM, used to adjust the variable gap and then the VCM with smaller volume can be adapted to reduce the system length of the optical imaging lens 10. In FIG. 29B, the grid indicated by "incapable for focusing" means that the optical imaging lens 10 cannot properly focus onto the object at each object length when the variable gap is Gab.

Figures 27A, 27B, 27C, 27D:
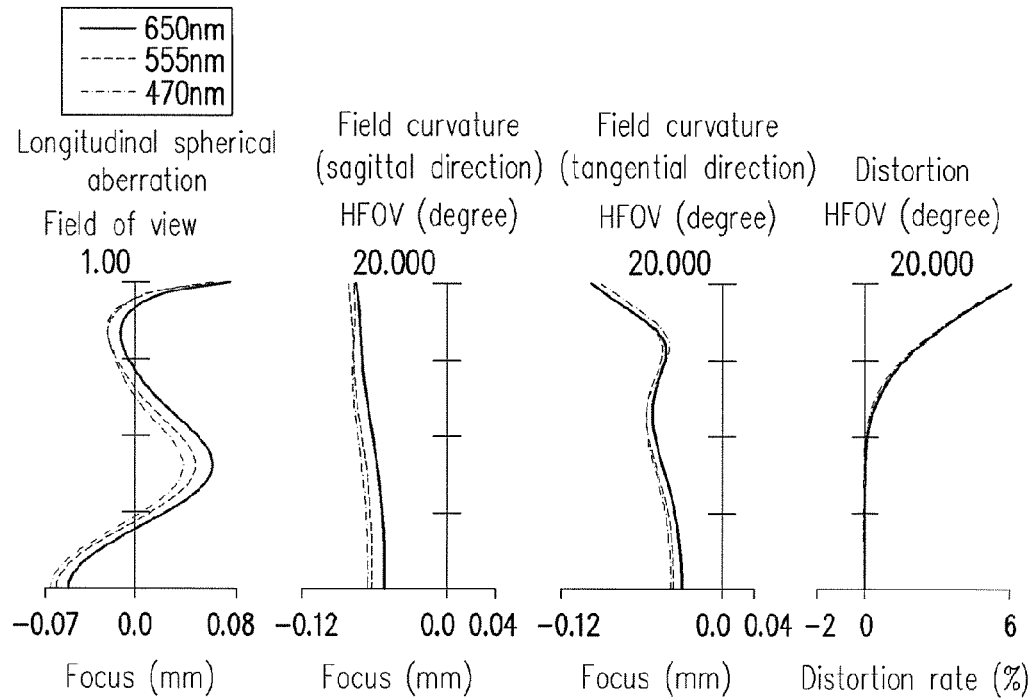
FIG. 27A to FIG. 27D are drawings, schematically illustrating the longitudinal spherical aberration and various kinds of aberration of optical imaging lens, according to the sixth embodiment of the invention.

The longitudinal spherical aberration of the sixth embodiment in FIG. 27A is a simulation result when the pupil radius is set by 1.3400 mm. Further, in the longitudinal spherical aberration shown by FIG. 27A of the sixth embodiment, the deflection from the imaging point for the off-axial ray at different height is controlled within a range of ±0.075 mm. For the two field curvature aberrations shown in FIG. 27B and FIG. 27C, the varying range of focal length for three representative wavelengths in the whole field of view is within ±0.18 mm. Further, the distortion aberration in FIG. 27D has shown that the distortion aberration in the sixth embodiment can be kept within a range of ±6%. As a result, in comparing with the conventional optical lens, the sixth embodiment can still provide a better imaging quality even at the condition that the system length has been reduced down to about 5.256 mm.

As to the foregoing descriptions, the sixth embodiment in comparing with the third embodiment has the advantages: the lens length (that is system length) of the sixth embodiment is less than the lens length of the third embodiment; the longitudinal spherical aberration of the sixth embodiment is smaller than the longitudinal spherical aberration of the third embodiment; the sixth embodiment is easier in fabrication than the third embodiment so the yield is higher.

Figure 30:
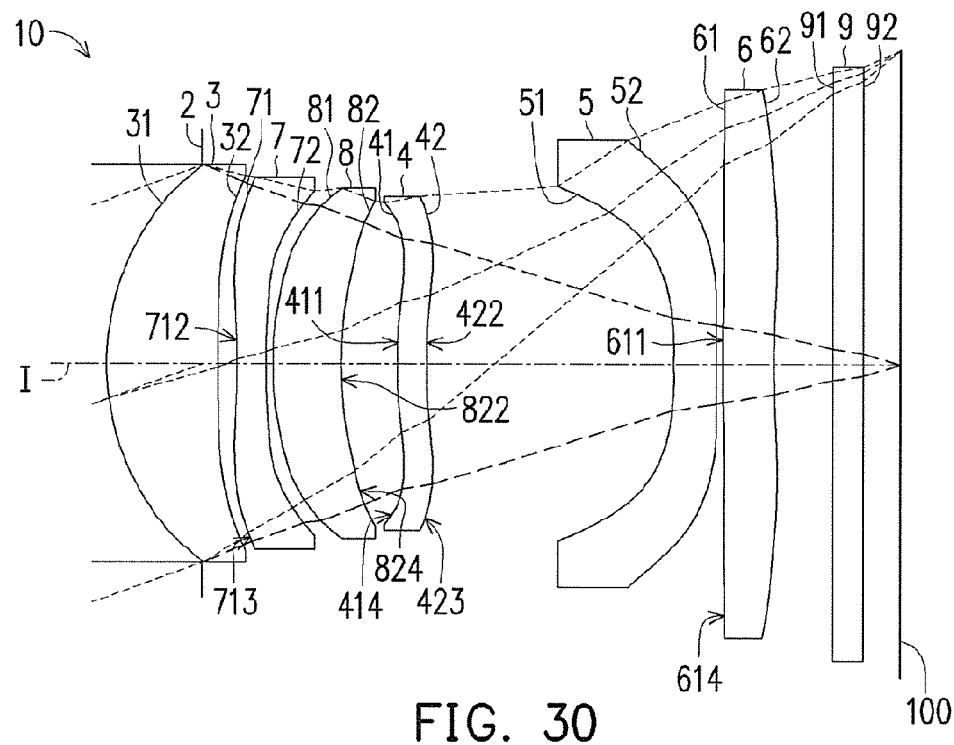
FIG. 30 is a drawing, schematically illustrating an optical imaging lens, according to a seventh embodiment of the invention.

FIG. 30 is a drawing, schematically illustrating an optical imaging lens, according to a seventh embodiment of the invention. FIG. 31A to FIG. 31D are drawings, schematically illustrating the longitudinal spherical aberration and various kinds of aberration of optical imaging lens, according to the seventh embodiment of the invention. Referring to FIG. 30 first, a seventh embodiment of the optical imaging lens 10 is basically similar to the third embodiment but the optical data, the aspheric coefficients and the parameters between the lens elements 3, 4, 5, 6, 7, 8 may be more or less a little different. The differences between the two embodiments are described as follows. In the seventh embodiment, the object-side surface 71 of the first additional lens element 7 has a concave portion 712 in the vicinity of the optical axis I and a convex portion 713 in a vicinity of a periphery of the first additional lens element 7. The second additional lens element 8 has a negative refracting power. The image-side surface 82 of the second additional lens element 8 is a concave surface and has a concave portion 822 in the vicinity of the optical axis I and a concave portion 824 in a vicinity of a periphery of the second additional lens element 8. The object-side surface 41 of the second lens element 4 has a convex portion 411 in the vicinity of the optical axis I and a concave portion 414 in a vicinity of a periphery of the second lens element 4. The image-side surface 42 of the second lens element 4 has a concave portion 422 in the vicinity of the optical axis I and a convex portion 423 in a vicinity of a periphery of the second lens element 4. The third lens element 5 has a positive refracting power. The object-side surface 61 of the fourth lens element 6 has a convex portion 611 in the vicinity of the optical axis I and a concave portion 614 in a vicinity of a periphery of the fourth lens element. Remarkably here, to clearly show the drawing, the reference numerals for the concave portion and the convex portion in FIG. 30, like to the third embodiment, have been omitted.

The detailed optical data of the optical imaging lens 10 are shown in FIG. 32, and the effective focal length of the optical imaging lens 10 in the seventh embodiment is 5.364 mm, the HFOV is 20.000°, the F/# is 2.160, the system length is 5.339 mm, and the image height is 2.127 mm.

As shown in FIG. 33A, it is all of the aspheric coefficients in formula (1) from the object-side surface 31 of the first lens element 3 to the image-side surface 82 of the second additional lens element 8 in the seventh embodiment.

Further, relations between all of the essential parameters in the optical imaging lens 10 of the seventh embodiment are shown in FIG. 47.

In the embodiment, only one of several gaps in the optical imaging lens 10 can be a variable gap. When the variable gap is changed, it can cause the optical imaging lens 10 to focus onto the object at different object length. In FIG. 33B, when the variable gap is G1a, Gab, Gb2, G23, G34 or G4F, it lists the fG value, the EFL/(fG×F/#) value, and the shifting distance for focusing in the optical imaging lens 10, wherein the shifting distance for focusing is referring to an absolute value of a difference between a first value and a second value of a distance on the optical axis I of the variable gap when the optical imaging lens 10 is respectively focusing onto infinity (e.g. $1 \times 10^{10}$ mm) and 200 mm.

Referring to FIG. 33B, as seen in FIG. 33B, when the variable gap is G1a, that is, the variable gap is a distance on the optical axis I between the first lens element 3 and the first additional lens element 7, in which the shifting distance for focusing is the shortest, so the designer can choose G1a as the variable gap of the optical imaging lens 10 for focusing. As a result, it can have the shortest moving range of an actuator, such as VCM, used to adjust the variable gap and then the VCM with smaller volume can be adapted to reduce the system length of the optical imaging lens 10. In FIG. 33B, the three grids indicated by "incapable for focusing" mean that the optical imaging lens 10 cannot properly focus onto the object at each object length when the variable gap is Gab, G23, or G34.

Figures 31A, 31B, 31C, 31D:
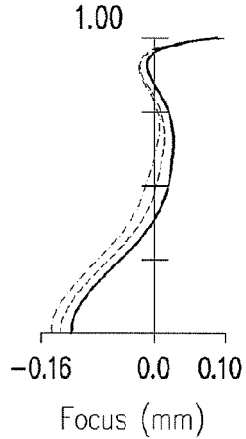
FIG. 31A to FIG. 31D are drawings, schematically illustrating the longitudinal spherical aberration and various kinds of aberration of optical imaging lens, according to the seventh embodiment of the invention.

The longitudinal spherical aberration of the seventh embodiment in FIG. 31A is a simulation result when the pupil radius is set by 1.3400 mm. Further, in the longitudinal spherical aberration shown by FIG. 31A of the seventh embodiment, the deflection from the imaging point for the off-axial ray at different height is controlled within a range of ±0.015 mm. For the two field curvature aberrations shown in FIG. 31B and FIG. 31C, the varying range of focal length for three representative wavelengths in the whole field of view is within ±0.16 mm. Further, the distortion aberration in FIG. 31D has shown that the distortion aberration in the seventh embodiment can be kept within a range of ±4%. As a result, in comparing with the conventional optical lens, the seventh embodiment can still provide a better imaging quality even at the condition that the system length has been reduced down to about 5.339 mm.

As to the foregoing descriptions, the seventh embodiment in comparing with the third embodiment has the advantages: the lens length (that is system length) of the seventh embodiment is less than the lens length of the third embodiment; the longitudinal spherical aberration of the seventh embodiment is smaller than the longitudinal spherical aberration of the third embodiment; the distortion aberration of the seventh embodiment is smaller than the distortion aberration of the third embodiment; the seventh embodiment is easier in fabrication than the third embodiment so the yield is higher.

Figure 34:
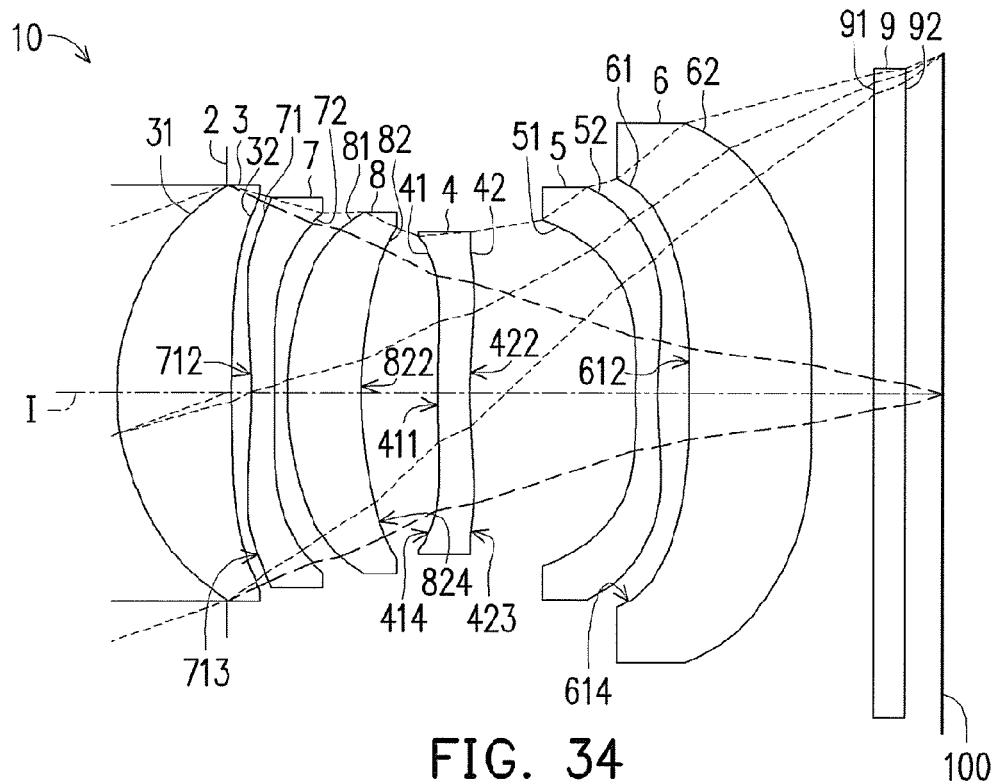
FIG. 34 is a drawing, schematically illustrating an optical imaging lens, according to an eighth embodiment of the invention.

FIG. 34 is a drawing, schematically illustrating an optical imaging lens, according to an eighth embodiment of the invention. FIG. 35A to FIG. 35D are drawings, schematically illustrating the longitudinal spherical aberration and various kinds of aberration of optical imaging lens, according to the eighth embodiment of the invention. Referring to FIG. 34 first, an eighth embodiment of the optical imaging lens 10 is basically similar to the third embodiment but the optical data, the aspheric coefficients and the parameters between the lens elements 3, 4, 5, 6, 7, 8 may be more or less a little different. The differences between the two embodiments are described as follows. In the eighth embodiment, the object-side surface 71 of the first additional lens element 7 has a concave portion 712 in the vicinity of the optical axis I and a convex portion 713 in a vicinity of a periphery of the first additional lens element 7. The image-side surface 82 of the second additional lens element 8 is a concave surface and has a concave portion 822 in the vicinity of the optical axis I and a concave portion 824 in a vicinity of a periphery of the second additional lens element 8. The object-side surface 41 of the second lens element 4 has a convex portion 411 in the vicinity of the optical axis I and a concave portion 414 in a vicinity of a periphery of the second lens element 4. The image-side surface 42 of the second lens element 4 has a concave portion 422 in the vicinity of the optical axis I and a convex portion 423 in a vicinity of a periphery of the second lens element 4. The fourth lens element 6 has a negative refracting power. The object-side surface 61 of the fourth lens element 6 is a concave surface and has a concave portion 612 in the vicinity of the optical axis I and a concave portion 614 in a vicinity of a periphery of the fourth lens element 6. Remarkably here, to clearly show the drawing, the reference numerals for the concave portion and the convex portion in FIG. 34, like to the first embodiment, have been omitted.

The detailed optical data of the optical imaging lens 10 are shown in FIG. 36, and the effective focal length of the optical imaging lens 10 in the eighth embodiment is 5.328 mm, the HFOV is 20°, the F/# is 2.294, the system length is 5.318 mm, and the image height is 2.192 mm.

As shown in FIG. 37A, it is all of the aspheric coefficients in formula (1) from the object-side surface 31 of the first lens element 3 to the image-side surface 82 of the second additional lens element 8 in the eighth embodiment.

Further, relations between all of the essential parameters in the optical imaging lens 10 of the eighth embodiment are shown in FIG. 47.

In the embodiment, only one of several gaps in the optical imaging lens 10 can be a variable gap. When the variable gap is changed, it can cause the optical imaging lens 10 to focus onto the object at different object length. In FIG. 37B, when the variable gap is G1a, Gab, Gb2, G23, 634 or G4F, it lists the fG value, the EFL/(fG×F/#) value, and the shifting distance for focusing in the optical imaging lens 10, wherein the shifting distance for focusing is referring to an absolute value of a difference between a first value and a second value of a distance on the optical axis I of the variable gap when the optical imaging lens 10 is respectively focusing onto infinity (e.g. $1\times10^{10}$ mm) and 100 mm.

Referring to FIG. 37B, as seen in FIG. 37B, when the variable gap is Gb2, that is, the variable gap is a distance on the optical axis I between the second additional lens element 8 and the second lens element 4, in which the shifting distance for focusing is the shortest, so the designer can choose Gb2 as the variable gap of the optical imaging lens 10 for focusing. As a result, it can have the shortest moving range of an actuator, such as VCM, used to adjust the variable gap and then the VCM with smaller volume can be adapted to reduce the system length of the optical imaging lens 10. In FIG. 37B, the grid indicated by "incapable for focusing" means that the optical imaging lens 10 cannot properly focus onto the object at each object length when the variable gap is Gab.

Figures 35A, 35B, 35C, 35D:
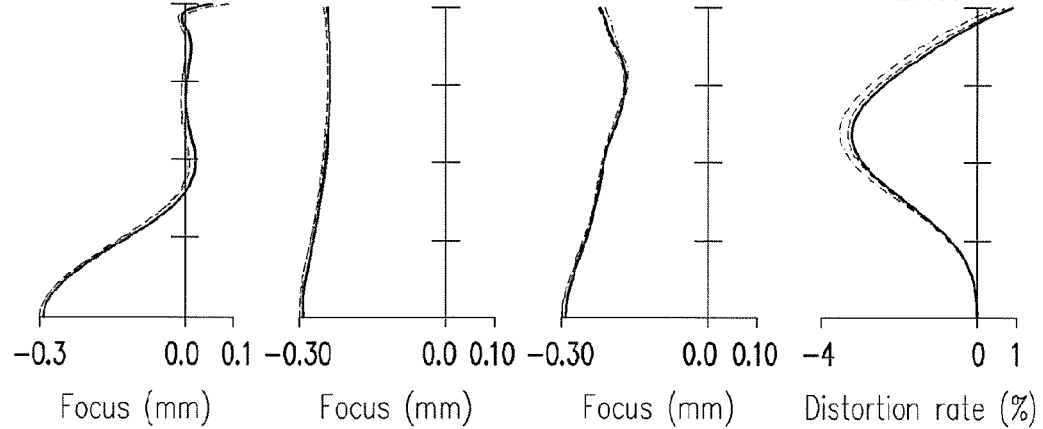
FIG. 35A to FIG. 35D are drawings, schematically illustrating the longitudinal spherical aberration and various kinds of aberration of optical imaging lens, according to the eighth embodiment of the invention.

The longitudinal spherical aberration of the eighth embodiment in FIG. 35A is a simulation result when the pupil radius is set by 1.3400 mm. Further, in the longitudinal spherical aberration shown by FIG. 35A of the eighth embodiment, the deflection from the imaging point for the off-axial ray at different height is controlled within a range of ±0.3 mm. For the two field curvature aberrations shown in FIG. 35B and FIG. 35C, the varying range of focal length for three representative wavelengths in the whole field of view is within ±0.30 mm. Further, the distortion aberration in FIG. 35D has shown that the distortion aberration in the eighth embodiment can be kept within a range of ±4%. As a result, in comparing with the conventional optical lens, the eighth embodiment can still provide a better imaging quality even at the condition that the system length has been reduced down to about 5.318 mm.

As to the foregoing descriptions, the eighth embodiment in comparing with the third embodiment has the advantages: the lens length (that is system length) of the eighth embodiment is less than the lens length of the third embodiment; the distortion aberration of the eighth embodiment is smaller than the distortion aberration of the third embodiment; the eighth embodiment is easier in fabrication than the third embodiment so the yield is higher.

Figure 38:
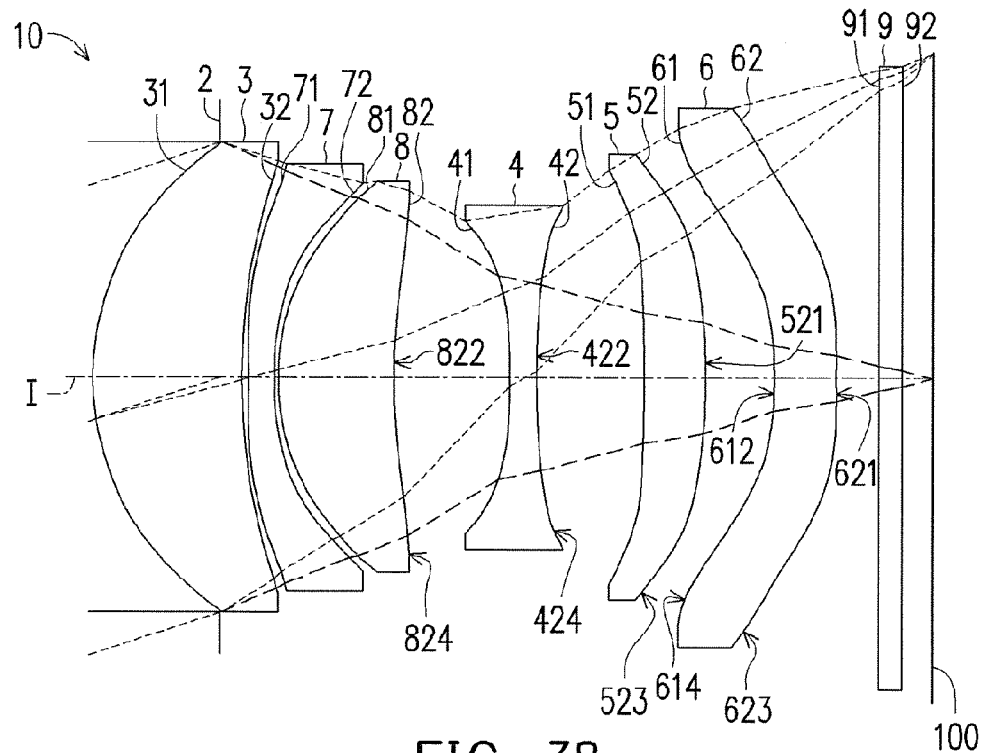
FIG. 38 is a drawing, schematically illustrating an optical imaging lens, according to a ninth embodiment of the invention.

FIG. 38 is a drawing, schematically illustrating an optical imaging lens, according to a ninth embodiment of the invention. FIG. 39A to FIG. 39D are drawings, schematically illustrating the longitudinal spherical aberration and various kinds of aberration of optical imaging lens, according to the ninth embodiment of the invention. Referring to FIG. 38 first, a ninth embodiment of the optical imaging lens 10 is basically similar to the third embodiment but the optical data, the aspheric coefficients and the parameters between the lens elements 3, 4, 5, 6, 7, 8 may be more or less a little different. The differences between the two embodiments are described as follows. In the ninth embodiment, the image-side surface 82 of the second additional lens element 8 is a concave surface and has a concave portion 822 in the vicinity of the optical axis I and a concave portion 824 in a vicinity of a periphery of the second additional lens element 8. The image-side surface 42 of the second lens element 4 is a concave surface and has a concave portion 422 in the vicinity of the optical axis I and a concave portion 424 in a vicinity of a periphery of the second lens element 4. The third lend elements 5 has a positive refracting power. The image-side surface 52 of the third lens element 5 has a convex portion 521 in the vicinity of the optical axis I and a convex portion 523 in a vicinity of a periphery of the third lens element 5. The fourth lens element 6 has a negative refracting power. The object-side surface 61 of the fourth lens element 6 is a concave surface and has a concave portion 612 in the vicinity of the optical axis I and a concave portion 614 in a vicinity of a periphery of the fourth lens element 6. The image-side surface 62 of the fourth lens element 6 is a convex surface and has a convex portion 621 in the vicinity of the optical axis I and a convex portion 623 in a vicinity of a periphery of the fourth lens element 6. Remarkably here, to clearly show the drawing, the reference numerals for the concave portion and the convex portion in FIG. 38, like to the third embodiment, have been omitted.

The detailed optical data of the optical imaging lens 10 are shown in FIG. 40, and the effective focal length of the optical imaging lens 10 in the ninth embodiment is 8.995 mm, the HFOV is 17.735°, the F/# is 2.019, the system length is 7.835 mm, and the image height is 2.944 mm.

As shown in FIG. 41A, it is all of the aspheric coefficients in formula (1) from the object-side surface 31 of the first lens element 3 to the image-side surface 82 of the second additional lens element 8 in the ninth embodiment.

Further, relations between all of the essential parameters in the optical imaging lens 10 of the ninth embodiment are shown in FIG. 47.

In the embodiment, only one of several gaps in the optical imaging lens 10 can be a variable gap. When the variable gap is changed, it can cause the optical imaging lens 10 to focus onto the object at different object length. In FIG. 41B, when the variable gap is G1a, Gab, Gb2, G23, G34 or G4F, it lists the fG value, the EFL/(fG×F/#) value, and the shifting distance for focusing in the optical imaging lens 10, wherein the shifting distance for focusing is referring to an absolute value of a difference between a first value and a second value of a distance on the optical axis I of the variable gap when the optical imaging lens 10 is respectively focusing onto infinity (e.g. $1\times10^{10}$ mm) and 100 mm.

Referring to FIG. 41B, as seen in FIG. 41B, when the variable gap is G23, that is, the variable gap is a distance on the optical axis I between the second lens element 4 and the third lens element 5, in which the shifting distance for focusing is the shortest, so the designer can choose G23 as the variable gap of the optical imaging lens 10 for focusing. As a result, it can have the shortest moving range of an actuator, such as VCM, used to adjust the variable gap and then the VCM with smaller volume can be adapted to reduce the system length of the optical imaging lens 10. In FIG. 41B, the grid indicated by "incapable for focusing" means that the optical imaging lens 10 cannot properly focus onto the object at each object length when the variable gap is Gab.

Figures 39A, 39B, 39C, 39D:
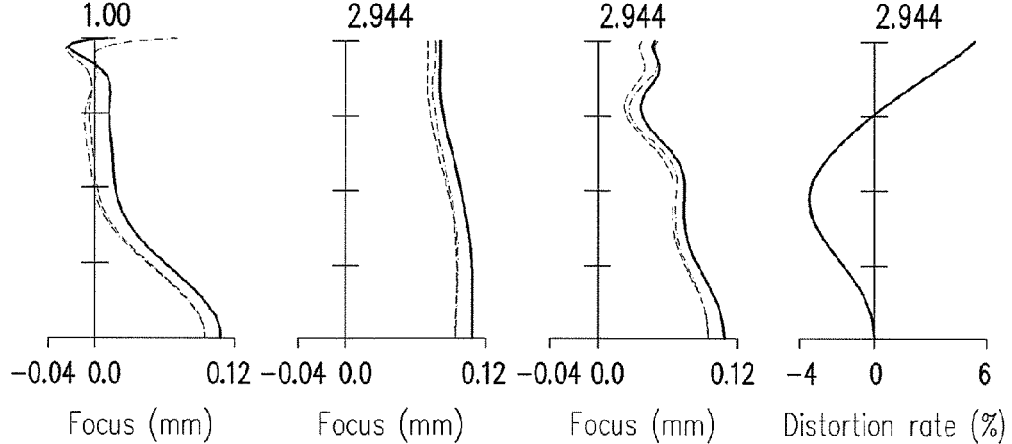
FIG. 39A to FIG. 39D are drawings, schematically illustrating the longitudinal spherical aberration and various kinds of aberration of optical imaging lens, according to the ninth embodiment of the invention.

The longitudinal spherical aberration of the ninth embodiment in FIG. 39A is a simulation result when the pupil radius is set by 2.1951 mm. Further, in the longitudinal spherical aberration shown by FIG. 39A of the ninth embodiment, the deflection from the imaging point for the off-axial ray at different height is controlled within a range of ±0.11 mm. For the two field curvature aberrations shown in FIG. 39B and FIG. 39C, the varying range of focal length for three representative wavelengths in the whole field of view is within ±0.12 mm. Further, the distortion aberration in FIG. 39D has shown that the distortion aberration in the eighth embodiment can be kept within a range of ±6%. As a result, in comparing with the conventional optical lens, the ninth embodiment can still provide a better imaging quality even at the condition that the system length has been reduced down to about 7.835 mm.

As to the foregoing descriptions, the ninth embodiment in comparing with the third embodiment has the advantages: the lens length (that is system length) of the eighth embodiment is less than the lens length of the third embodiment; the HFOV of the ninth embodiment is smaller than the HFOV of the third embodiment, good for achieving telephoto; the longitudinal spherical aberration of the ninth embodiment is smaller than the longitudinal spherical aberration of the third embodiment; the field curvature aberration of the ninth embodiment is less than the field curvature aberration of the third embodiment; the ninth embodiment is easier in fabrication than the third embodiment so the yield is higher.

Figure 42:
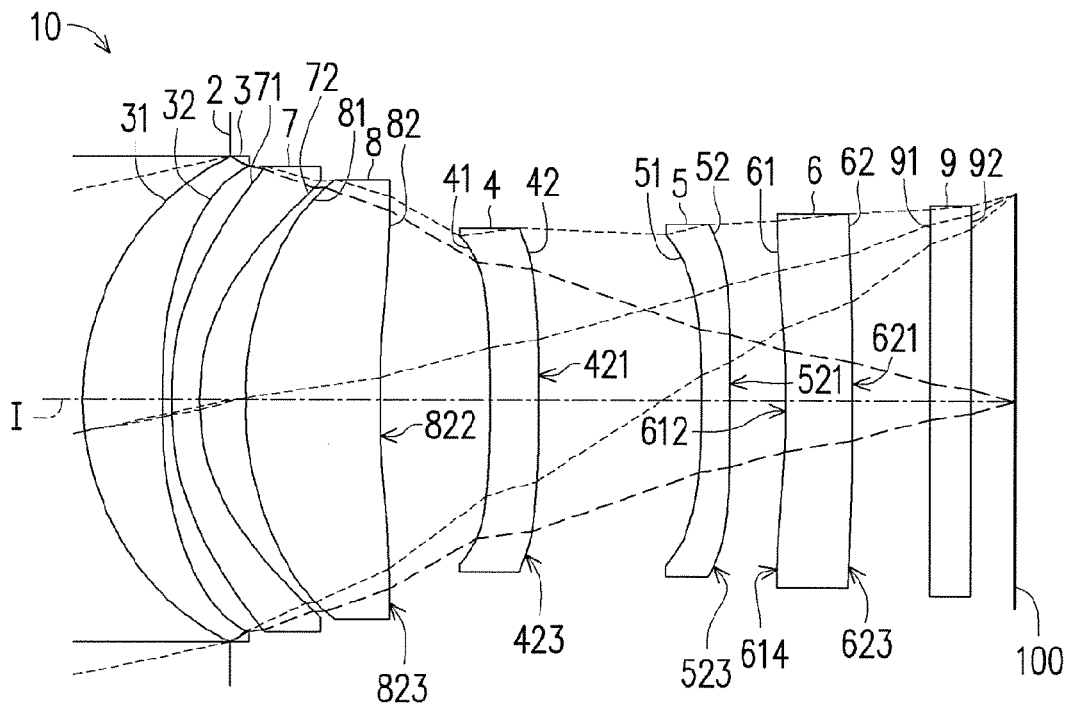
FIG. 42 is a drawing, schematically illustrating an optical imaging lens, according to a tenth embodiment of the invention.

FIG. 42 is a drawing, schematically illustrating an optical imaging lens, according to a tenth embodiment of the invention. FIG. 43A to FIG. 43D are drawings, schematically illustrating the longitudinal spherical aberration and various kinds of aberration of optical imaging lens, according to the ninth embodiment of the invention. Referring to FIG. 42 first, a tenth embodiment of the optical imaging lens 10 is basically similar to the third embodiment but the optical data, the aspheric coefficients and the parameters between the lens elements 3, 4, 5, 6, 7, 8 may be more or less a little different. The differences between the two embodiments are described as follows. In the tenth embodiment, the image-side surface 82 of the second additional lens element 8 has a concave portion 822 in the vicinity of the optical axis I and a convex portion 823 in a vicinity of a periphery of the second additional lens element 8. The image-side surface 42 of the second lens element 4 is a concave surface and has a convex portion 421 in the vicinity of the optical axis I and a concave portion 423 in a vicinity of a periphery of the second lens element 4. The image-side surface 52 of the third lens element 5 is a convex surface has a convex portion 521 in the vicinity of the optical axis I and a convex portion 523 in a vicinity of a periphery of the third lens element 5. The fourth lens element 6 has a negative refracting power. The object-side surface 61 of the fourth lens element 6 is a concave surface and has a concave portion 612 in the vicinity of the optical axis I and a concave portion 614 in a vicinity of a periphery of the fourth lens element 6. The image-side surface 62 of the fourth lens element 6 is a convex surface and has a convex portion 621 in the vicinity of the optical axis I and a convex portion 623 in a vicinity of a periphery of the fourth lens element 6. Remarkably here, to clearly show the drawing, the reference numerals for the concave portion and the convex portion in FIG. 42, like to the third embodiment, have been omitted.

The detailed optical data of the optical imaging lens 10 in the tenth embodiment are shown in FIG. 44. The effective focal length (EFL) of the optical imaging lens 10 in the tenth embodiment is 5.217 mm, the HFOV is 12.5°, the F/# is 1.928, the system length is 4.856 mm, and the image height is 1.087 mm.

As shown in FIG. 45A, it is all of the aspheric coefficients in formula (1) from the object-side surface 31 of the first lens element 3 to the image-side surface 82 of the second additional lens element 8 in the tenth embodiment.

Further, relations between all of the essential parameters in the optical imaging lens 10 of the tenth embodiment are shown in FIG. 47.

In the embodiment, only one of several gaps in the optical imaging lens 10 can be a variable gap. When the variable gap is changed, it can cause the optical imaging lens 10 to focus onto the object at different object length. In FIG. 45B, when the variable gap is G1a, Gab, Gb2, G23, G34 or G4F, it lists the fG value, the EFL/(fG×F/#) value, and the shifting distance for focusing in the optical imaging lens 10, wherein the shifting distance for focusing is referring to an absolute value of a difference between a first value and a second value of a distance on the optical axis I of the variable gap when the optical imaging lens 10 is respectively focusing onto infinity (e.g. $1\times10^{10}$ mm) and 200 mm.

Referring to FIG. 45B, as seen in FIG. 45B, when the variable gap is G1a, that is, the variable gap is a distance on the optical axis I between the first lens element 3 and the first additional lens element 7, in which the shifting distance for focusing is the shortest, so the designer can choose G1a as the variable gap of the optical imaging lens 10 for focusing. As a result, it can have the shortest moving range of an actuator, such as VCM, used to adjust the variable gap and then the VCM with smaller volume can be adapted to reduce the system length of the optical imaging lens 10. In FIG. 45B, the grid indicated by "incapable for focusing" mean that the optical imaging lens 10 cannot properly focus onto the object at each object length when the variable gap is Gab.

Figures 43A, 43B, 43C, 43D:
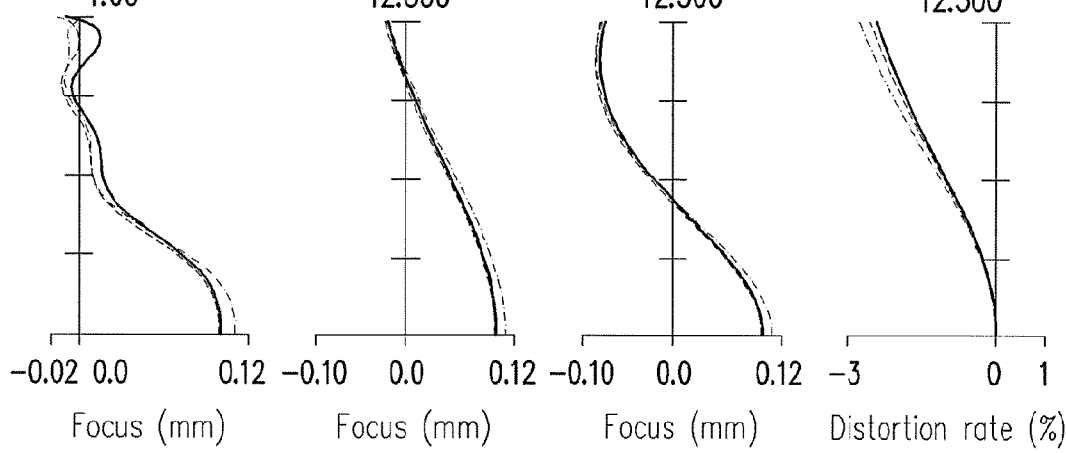
FIG. 43A to FIG. 43D are drawings, schematically illustrating the longitudinal spherical aberration and various kinds of aberration of optical imaging lens, according to the tenth embodiment of the invention.

The longitudinal spherical aberration of the tenth embodiment in FIG. 43A is a simulation result when the pupil radius is set by 1.2725 mm. Further, in the longitudinal spherical aberration shown by FIG. 43A of the tenth embodiment, the deflection from the imaging point for the off-axial ray at different height is controlled within a range of ±0.11 mm. For the two field curvature aberrations shown in FIG. 43B and FIG. 43C, the varying range of focal length for three representative wavelengths in the whole field of view is within ±0.12 mm. Further, the distortion aberration in FIG. 43D has shown that the distortion aberration in the eighth embodiment can be kept within a range of ±3%. As a result, in comparing with the conventional optical lens, the tenth embodiment can still provide a better imaging quality even at the condition that the system length has been reduced down to about 4.856 mm.

As to the foregoing descriptions, the tenth embodiment in comparing with the third embodiment has the advantages: the lens length (that is system length) of the eighth embodiment is less than the lens length of the third embodiment; the HFOV of the tenth embodiment is smaller than the HFOV of the third embodiment, good for achieving telephoto; the longitudinal spherical aberration of the tenth embodiment is smaller than the longitudinal spherical aberration of the third embodiment; the field curvature aberration of the tenth embodiment is less than the field curvature aberration of the third embodiment; the tenth embodiment is easier in fabrication than the third embodiment so the yield is higher.

Further referring to FIG. 46 and FIG. 47, FIG. 46 is a table in drawing for the various optical parameters in the first embodiment to the fifth embodiment and FIG. 47 is a table in drawing for the various optical parameters in the sixth embodiment to the tenth embodiment.

The first lens element of the optical imaging lens 10 in the embodiments of the invention has a positive refracting power and the vicinity of the optical axis I on the object-side surface 31 is a convex portion 311, which is good for converging ray. In addition, with the second lens element 4 having refracting power, it is easy to fix the main aberration occurring in front of the second lens element 4, that is, the object side of the second lens element 4. At least one of the object-side surface 51 and the image-side surface 52 of the third lens element 5 is aspheric surface, so to easily fix, in assistance, the coma aberration, astigmatism, field curvature, distortion and off-axis chromatic aberration. Both the object-side surface 61 and the image-side surface 62 of the fourth lens element 6 are aspheric surfaces, good for mainly fixing the coma aberration, astigmatism, field curvature, distortion and off-axis chromatic aberration. The aperture 2 is implemented at the location in front of the first lens element 3, that is the object side of the first lens element 3, or between the first lens element 3 and the second lens element 4 and with other lens elements, so to be good for increasing the available aperture, so to reduce the F/#.

When a relation formula of each optical parameter of the optical imaging lens 10 in the embodiment of the invention can meet at least one of the following condition expressions, it can assist the designer to design out an optical imaging lens, which has good optical performance, a total length effectively reduced, and being technical enablement.

1. When the optical imaging lens 10 satisfies the condition of 0.5≤EFL/(fG×F/#), this means the designing intension for telephoto lens with large aperture. It is good for decreasing the shift range for focusing at short distance and increasing the incident aperture at the same time when the focal length of the lens group in front of the variable gap (that is, the object side of the variable gap) is shorter and the refracting power is larger. Preferably, the condition is 0.7≤EFL/(fG×F/#). The upper limit may be 2.25, that is, 0.7≤EFL/(fG×F/#)≤2.25 to avoid designing difficulty of lens due to excessive refracting power.

2. When the optical imaging lens 10 satisfies the condition of (TTL×F/#)/EFL≤2.4, this is good for increasing the incident aperture and not increasing the lens length at the same time, so the lens with large aperture can be easily designed. Preferably, the condition is 0.8≤(TTL×F/#)/EFL≤2.4.

3. When the optical imaging lens 10 satisfies the condition of 1.5≤EFL/fG, this is good as intended for decreasing the shift range for focusing at short distance in telephoto lens when the focal length of the lens group in front of the variable gap (that is, the object side of the variable gap) is shorter and the refracting power is 1.5 times of the system focal length.

4. When the optical imaging lens 10 satisfies the condition of HFOV≤25°, AAG>ALT, 1≤EFL/TTL, or 2.4≤EFL/ALT, this is good for increasing capability of the lens to take photo on a far object. Preferably, the condition is 1≤EFL/TTL≤1.6 or 2.4≤EFL/ALT≤4.5.

5. As to the conditions of: (BFL×F/#)/T1≤4; (BFL×F/#)/AAG≤1.3; (BFL×F/#)/|G23−G34|≤6; (T2+T3+T4)/T1≤1.8; ((T2+T3+T4)×F/#)/AAG≤1.8; ((T2+T3+T4)×F/#)/|G23−G34|≤8; ((T2+T3+T4)×F/#)/(T2+G23+T3+G34+T4)≤1.3; ((T2+T3)×F/#)/T1≤2.8; ((T2+T3)×F/#)/AAG≤1; ((T2+T3)×F/#)/|G23−G34|≤4.7; ((T2+T4)×F/#)/T1≤3.8; ((T2+T4)×F/#)/AAG≤1.3; ((T2+T4)×F/#)/|G23−G34|≤4.7, and preferably as 1.3≤(BFL×F/#)/T1≤4; 0.3≤(BFL×F/#)/AAG≤1.3; 0.9≤(BFL×F/#)/|G23−G34|≤6; 0.7≤(T2+T3+T4)/T1≤1.8; 0.5≤((T2+T3+T4)×F/#)/AAG≤1.8; 1≤((T2+T3+T4)×F/#)/|G23−G34|≤8; 0.4≤((T2+T3+T4)×F/#)/(T2+G23+T3+G34+T4)≤1.3; 0.9≤((T2+T3)×F/#)/T1≤2.8; 0.2≤((T2+T3)×F/#)/AAG≤1; 0.4≤((T2+T3)×F/#)/|G23−G34|≤4.7; 1.1≤((T2+T4)×F/#)/T≤3.8; 0.4≤((T2+T4)×F/#)/AAG≤1.3; 0.5≤((T2+T4)×F/#)/|G23−G34|≤4.7, it is to maintain the proper values for thickness and gap for each lens, so to avoid any one of the parameters to be excessive and not good for designing in large aperture of the optical imaging lens as a whole, or avoid any one of the parameters to be too small and resulting in influencing the assembly or increasing the fabrication difficulty. Alternatively, it can choose any combination of parameters from the embodiments to restrict the lens, so to be good for designing the lens under the same aspect of the embodiments.

As to the fact of unpredictability in designing optical system, under aspect of the invention, satisfying the above conditions can reduce the lens length, increase available aperture, improve image quality and improve imaging clarity when taking photo at long distance or short distance, or improve the assembly yield for the telephoto lens in the invention, and then can solve the disadvantages in convention technology.

As to the foregoing relation formulas as provided for examples, the embodiment aspects of the invention can take a combination of a certain number of the relation formulas without just limiting to the formulas as provided. in the practice of the invention, except the above relation formulas, it can also involve designing other more detailed structures to a single lens element or multiple lens elements as generally about concave/convex surfaces of more lens elements in sequence, so to increase control of the system performance and/or resolution. As an example, the object-side surface of the first lens elements can additionally formed as an option with a convex portion in the vicinity of the optical axis or to be a positive refracting power. Remarkably, the details in combination as an option should be done at the situation without confliction, so to form other embodiments.

As to the foregoing descriptions, the optical imaging lens 10 of the embodiments in the invention can have the effects and advantages as follows.

1. All of the longitudinal spherical aberration, the field curvature aberration, and the distortion aberration in each embodiment of the invention are in compliance with use specification. In addition, the off-axial ray at different height for the three representative wavelengths of 650 nm (red light), 555 nm (green light), and 470 nm (blue light) are all concentrated to a nearby of the imaging point. As to the deflection amplitude for each curve, the deflection from the image point for the off-axial ray at different height can be controlled, so to have good capability to suppress the spherical aberration, aberration, distortion. Further referring to the data about imaging quality, the distances between one another of the three representative wavelengths of 650 nm, 555 nm, and 470 nm are also quite close. This indicates that the embodiments of the invention can have good capability of concentration for the rays of different wavelengths in various states, so that the embodiments of the invention have good optical properties based on above descriptions.

2. The first lens element 3 of the optical imaging lens 10 in the embodiments of the invention has a positive refracting power and the object-side surface 31 thereof in the vicinity of the optical axis is a convex portion 311. This is good for converging rays. In addition, the optical imaging lens 10 satisfies 0.5≤EFL/(fG×F/#), and is good for increasing the incident aperture and decreasing the shift range for focusing at short distance at the same time, and then effectively reducing the lens length. By a combination between the above designs, the lens length can be effectively reduced, and the image quality can be assured, and further the imaging clarity for taking far or near photo can be improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An optical imaging lens, comprising:
   a plurality of lens elements arranged in order from an object side to an image side along an optical axis, the lens elements comprising a first lens element, a second lens element, a third lens element, and a fourth lens element, arranged in order from the object side to the image side along the optical axis, the first lens element is arranged to be a lens element having refracting power in a first order from the object side to the image side, the fourth lens element is arranged to be a lens element having refracting power in a first order from the image side to the object side, the third lens element is arranged to be a lens element having refracting power in a second order from the image side to the object side, the second lens element is arranged to be a lens element having refracting power in a third order from the image side to the object side, each of the first to the fourth lens elements respectively having an object-side surface facing the object side and allowing image rays to pass through, and an image-side surface facing the image side and allowing the image rays to pass through;
   the first lens element having a positive refracting power and the object-side surface of the first lens element having a convex portion in a vicinity of the optical axis;
   at least one of the object-side surface and the image-side surface of the third lens element being an aspheric surface;
   the object-side surface and the image-side surface of the fourth lens element being both aspheric surfaces; and
   the optical imaging lens having only one variable gap, and the variable gap being a gap between adjacent two lens elements,
   wherein the optical imaging lens satisfies:

$0.7 \leq EFL/(fG \times F/\#)$, where EFL is an effective focal length of the optical imaging lens, fG is a focal length of a lens group formed from all of lens elements at an object side of the variable gap, and F/# is a f-number of the optical imaging lens.

2. The optical imaging lens of claim 1, wherein the optical imaging lens further satisfies 1.5≤EFL/fG.

3. The optical imaging lens of claim 1, wherein the optical imaging lens further satisfies HFOV≤25°, where HFOV is a half field of view of the optical imaging lens.

4. The optical imaging lens of claim 1, wherein the optical imaging lens further satisfies AAG>ALT, wherein AAG is a summation of a distance on the optical axis from the first lens element to the second lens element, a distance on the optical axis from the second lens element to the third lens element, and a distance on the optical axis from the third lens element to the fourth lens element, and ALT is a summation of thicknesses on the optical axis of the first lens element, the second lens element, the third lens element, and the fourth lens element.

5. The optical imaging lens of claim 1, wherein the optical imaging lens further satisfies 1≤EFL/TTL, where TTL is a distance on the optical axis from the objet-side surface of the first lens element to an image plane of the optical imaging lens.

6. The optical imaging lens of claim 1, wherein the optical imaging lens further satisfies 2.4≤EFL/ALT, where ALT is a summation of thicknesses on the optical axis of the first lens element, the second lens element, the third lens element, and the fourth lens element.

7. An optical imaging lens, comprising:
   a plurality of lens elements, arranged in order from an object side to an image side along an optical axis, the lens elements comprising a first lens element, a second lens element, a third lens element, and a fourth lens element, arranged in order from the object side to the image side along the optical axis, the first lens element is arranged to be a lens element having refracting power in a first order from the object side to the image side, the fourth lens element is arranged to be a lens element having refracting power in a first order from the image side to the object side, the third lens element is arranged to be a lens element having refracting power in a second order from the image side to the object side, the second lens element is arranged to be a lens element having refracting power in a third order from the image side to the object side, each of the first to the fourth lens elements having an object-side surface facing the object side and allowing image rays to pass through, and an image-side surface facing the image side and allowing the image rays to pass through;
   the first lens element having a positive refracting power and the object-side surface of the first lens element having a convex portion in a vicinity of the optical axis;
   at least one of the object-side surface and the image-side surface of the third lens element being an aspheric surface;
   the object-side surface and the image-side surface of the fourth lens element being both aspheric surfaces; and
   the optical imaging lens having only one variable gap,
   wherein the optical imaging lens satisfies:

$0.5 \leq EFL/(fG \times F/\#)$; and $(TTL \times F/\#)/EFL \leq 2.4$, where EFL is an effective focal length of the optical imaging lens, fG is a focal length of a lens group formed from all of lens elements at an object side of the variable gap, F/# is a f-number of the optical imaging lens, and TTL is distance on the optical axis between the object-side surface of the first lens element and an image plane of the optical image lens.

8. The optical imaging lens of claim 7, wherein the optical imaging lens further satisfies (BFL×F/#)/T1≤4, where BFL is a distance on the optical axis from the image-side surface of the fourth lens element to the image plane of the optical imaging lens, and T1 is a thickness of the first lens element on the optical axis.

9. The optical imaging lens of claim 7, wherein the optical imaging lens further satisfies (BFL×F/#)/AAG ≤1.3, where BFL is a distance on the optical axis from the image-side surface of the fourth lens element to the image plane of the optical imaging lens, and AAG is a summation of a distance on the optical axis from the first lens element to the second lens element, a distance on the optical axis from the second lens element to the third lens element, and a distance on the optical axis from the third lens element to the fourth lens element.

10. The optical imaging lens of claim 7, wherein the optical imaging lens further satisfies (BFL×F/#)/|G23−G34|≤6, where BFL is a distance on the optical axis from the image-side surface of the fourth lens element to the image plane of the optical imaging lens, G23 is a distance on the optical axis from the second lens element to the third lens element, and G34 is a distance on the optical axis from the third lens element to the fourth lens element.

11. The optical imaging lens of claim 7, wherein the optical imaging lens further satisfies (T2+T3+T4)/T1≤1.8, where T2 is a thickness of the second lens element on the optical axis, T3 is a thickness of the third lens element on the optical axis, T4 is a thickness of the fourth lens element on the optical axis, and T1 is a thickness of the first lens element on the optical axis.

12. The optical imaging lens of claim 7, wherein the optical imaging lens further satisfies ((T2+T3+T4)×F/#)/AAG≤1.8, where T2 is a thickness of the second lens element on the optical axis, T3 is a thickness of the third lens element on the optical axis, T4 is a thickness of the fourth lens element on the optical axis, and AAG is a summation of a distance on the optical axis from the first lens element to the second lens element, a distance on the optical axis from the second lens element to the third lens element, and a distance on the optical axis from the third lens element to the fourth lens element.

13. The optical imaging lens of claim 7, wherein the optical imaging lens further satisfies ((T2+T3+T4)×F/#)/|G23−G34|≤8, where T2 is a thickness of the second lens element on the optical axis, T3 is a thickness of the third lens element on the optical axis, T4 is a thickness of the fourth lens element on the optical axis, G23 is a distance on the optical axis from the second lens element to the third lens element, and G34 is a distance on the optical axis from the third lens element to the fourth lens element.

14. The optical imaging lens of claim 7, wherein the optical imaging lens further satisfies ((T2+T3+T4)×F/#)/(T2+G23+T3+G34+T4) ≤1.3, where T2 is a thickness of the second lens element on the optical axis, T3 is a thickness of the third lens element on the optical axis, T4 is a thickness of the fourth lens element on the optical axis, G23 is a distance on the optical axis from the second lens element to the third lens element, and G34 is a distance on the optical axis from the third lens element to the fourth lens element.

15. The optical imaging lens of claim 7, wherein the optical imaging lens further satisfies ((T2+T3)×F/#)/T1≤2.8, where T2 is a thickness of the second lens element on the optical axis, T3 is a thickness of the third lens element on the optical axis, and T1 is a thickness of the first lens element on the optical axis.

16. The optical imaging lens of claim 7, wherein the optical imaging lens further satisfies ((T2+T3)×F/#)/AAG≤1, where T2 is a thickness of the second lens element on the optical axis, T3 is a thickness of the third lens element on the optical axis, and AAG is a summation of a distance on the optical axis from the first lens element to the second lens element, a distance on the optical axis from the second lens element to the third lens element, and a distance on the optical axis from the third lens element to the fourth lens element.

17. The optical imaging lens of claim 7, wherein the optical imaging lens further satisfies ((T2+T3)×F/#)/|G23−G34|≤4.7, where T2 is a thickness of the second lens element on the optical axis, T3 is a thickness of the third lens element on the optical axis, G23 is a distance on the optical axis from the second lens element to the third lens element, and G34 is a distance on the optical axis from the third lens element to the fourth lens element.

18. The optical imaging lens of claim 7, wherein the optical imaging lens further satisfies ((T2+T4)×F/#)/T1 ≤3.8, where T2 is a thickness of the second lens element on the optical axis, T4 is a thickness of the fourth lens element on the optical axis, and T1 is a thickness of the first lens element on the optical axis.

19. The optical imaging lens of claim 7, wherein the optical imaging lens further satisfies ((T2+T4)×F/#)/AAG≤1.3, where T2 is a thickness of the second lens element on the optical axis, T4 is a thickness of the fourth lens element on the optical axis, and AAG is a summation of a distance on the optical axis from the first lens element to the second lens element, a distance on the optical axis from the second lens element to the third lens element, and a distance on the optical axis from the third lens element to the fourth lens element.

20. The optical imaging lens of claim 7, wherein the optical imaging lens further satisfies ((T2+T4)×F/#)/|G23−G34|≤4.7, where T2 is a thickness of the second lens element on the optical axis, T4 is a thickness of the fourth lens element on the optical axis, G23 is a distance on the optical axis from the second lens element to the third lens element, and G34 is a distance on the optical axis from the third lens element to the fourth lens element.

* * * * *